(12) United States Patent
Matsugu

(10) Patent No.: US 7,707,128 B2
(45) Date of Patent: Apr. 27, 2010

(54) PARALLEL PULSE SIGNAL PROCESSING APPARATUS WITH PULSE SIGNAL PULSE COUNTING GATE, PATTERN RECOGNITION APPARATUS, AND IMAGE INPUT APPARATUS

(75) Inventor: Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 540 days.

(21) Appl. No.: 10/592,954

(22) PCT Filed: Mar. 16, 2005

(86) PCT No.: PCT/JP2005/005297

§ 371 (c)(1),
(2), (4) Date: May 8, 2007

(87) PCT Pub. No.: WO2005/088535

PCT Pub. Date: Sep. 22, 2005

(65) Prior Publication Data

US 2007/0208678 A1 Sep. 6, 2007

(30) Foreign Application Priority Data

Mar. 17, 2004 (JP) .............................. 2004-077041

(51) Int. Cl.
*G06T 1/20* (2006.01)
*G06K 9/20* (2006.01)
*G06K 9/36* (2006.01)
*G06K 9/46* (2006.01)

(52) U.S. Cl. .................... 706/18; 382/181; 382/190; 706/20; 706/26; 706/27

(58) Field of Classification Search .................... 706/18
See application file for complete search history.

(56) References Cited

U.S. PATENT DOCUMENTS 4,974,169 A    11/1990    Engel .......................... 364/513

(Continued)

FOREIGN PATENT DOCUMENTS

EP    1 262 912 A2    12/2002

(Continued)

OTHER PUBLICATIONS

Matsugu, Hierarchical Pulse-coupled Neural Network Model with Temporal Coding and Emergent Feature Binding Mechanism, 2001.*

(Continued)

*Primary Examiner*—David R Vincent
*Assistant Examiner*—Nathan H Brown, Jr.
(74) *Attorney, Agent, or Firm*—Fitzpatrick, Cella, Harper & Scinto

(57) ABSTRACT

In a parallel pulse signal processing apparatus including a plurality of pulse output arithmetic elements (2), a plurality of connection elements (3) which parallelly connect predetermined arithmetic elements, and a gate circuit (5) which selectively passes pulse signals from the plurality of connection elements, the arithmetic element inputs a plurality of time series pulse signals, executes predetermined modulation processing on the basis of the plurality of time series pulse signals which are input, and outputs a pulse signal on the basis of a result of modulation processing, wherein the gate circuit selectively passes, of the signals from the plurality of connection elements, a finite number of pulse signals corresponding to predetermined upper output levels.

22 Claims, 23 Drawing Sheets

U.S. PATENT DOCUMENTS

| | | | |
|---|---|---|---|
| 5,179,596 A | 1/1993 | Weingard | 382/15 |
| 5,263,122 A | 11/1993 | Nunally | 395/27 |
| 5,664,065 A | 9/1997 | Johnson | 395/21 |
| 5,704,016 A | 12/1997 | Shigematsu et al. | 395/27 |
| 6,088,490 A | 7/2000 | Iwata et al. | 382/312 |

FOREIGN PATENT DOCUMENTS

| | | |
|---|---|---|
| JP | 55-124879 | 9/1980 |
| JP | 2-64788 | 3/1990 |
| JP | 6-83944 | 3/1994 |
| JP | 07-262157 | 10/1995 |
| JP | 07-334478 | 12/1995 |
| JP | 08-153148 | 6/1996 |
| JP | 2624143 | 4/1997 |
| JP | 2679730 | 8/1997 |
| JP | 2879670 | 1/1999 |
| WO | WO 00/29970 | 5/2000 |
| WO | WO 2005/119620 | 6/2005 |
| WO | WO 2006/046723 | 10/2005 |

OTHER PUBLICATIONS

Fukushima, et al., "Neocognitron: A New Algorithm for Pattern Recognition Tolerant of Deformation and Shifts in Position", Pattern Recognition, vol. 15, 1982, pp. 455-469.

Murray, et al., "Pulse-Stream VLSI Neural Networks Mixing Analog and Digital Techniques", IEEE Trans. on Neutral Networks, vol. 2, 1991, pp. 193-204.

Eckhorn, et al., "Feature Linking via Synchronization among Distributed Assemblies: Simulation of Results from Cat Visual Cortex", Neural Computation, vol. 2, 1990, pp. 293-307.

Broussard, et al., "Physiologically Motivated Image Fusion for Object Detection using a Pulse Coupled Neural Network", IEEE Trans. on Neural Networks, vol. 10, 1999, pp. 554-563.

LeCun, et al., "Convolutional Networks for Images, Speech, and Time Series", in Handbook of Brain Theory and Neural Networks (M. Arbib. Ed.), MIT press,1995, pp. 255-258.

Daugman, "Complete Discrete 2-D Gabor Transforms by Neural Networks for Image Analysis and Compression", IEEE Trans. on Acoustics, Speech, and Signal Processing, vol. 36, 1988, pp. 1169-1179.

Indiveri, "A Neuromorphic VLSI Device for Implementing 2-D Selective Attention Systems", IEEE Trans. on Neural Networks, vol. 12, 2001, pp. 1455-1463.

* cited by examiner

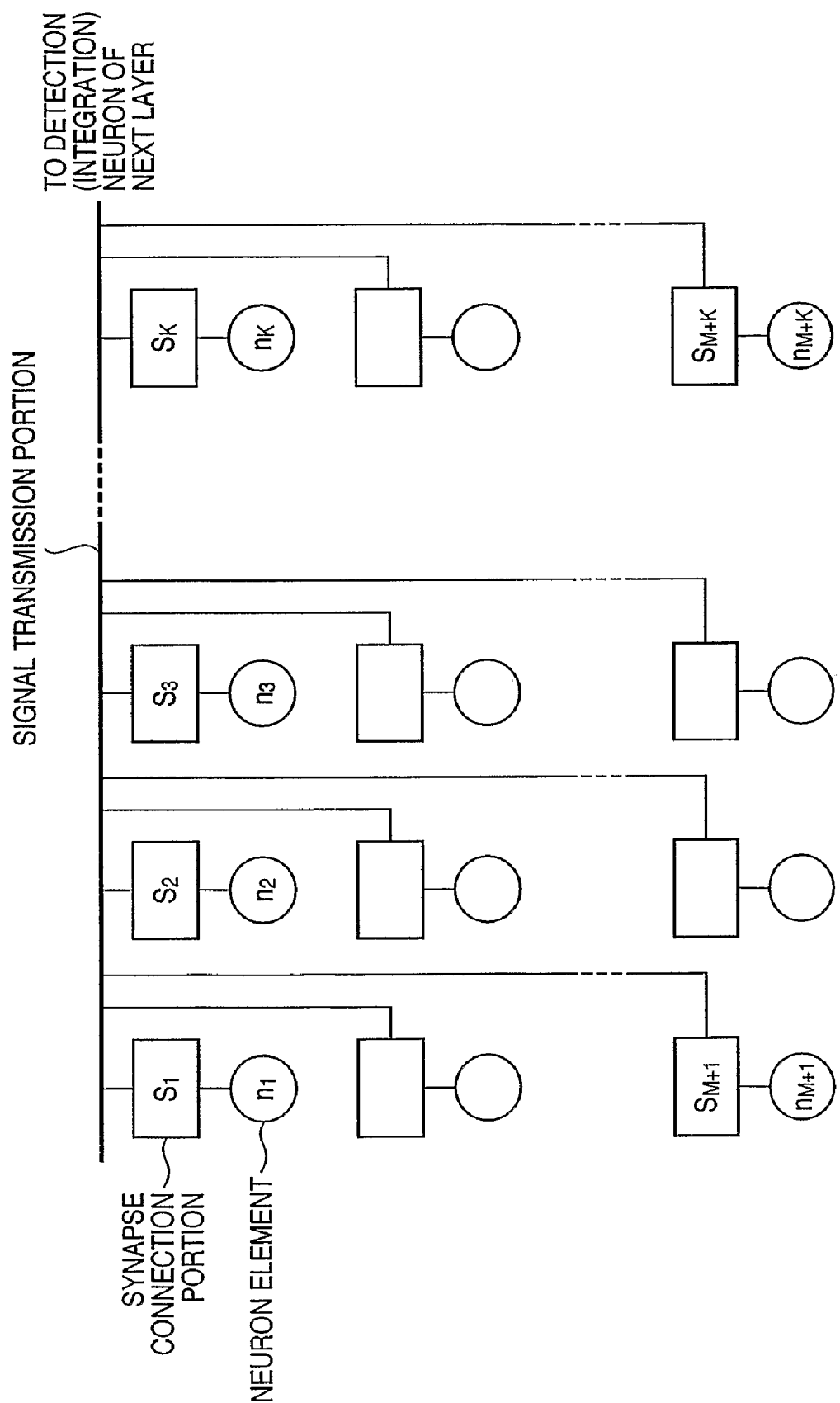

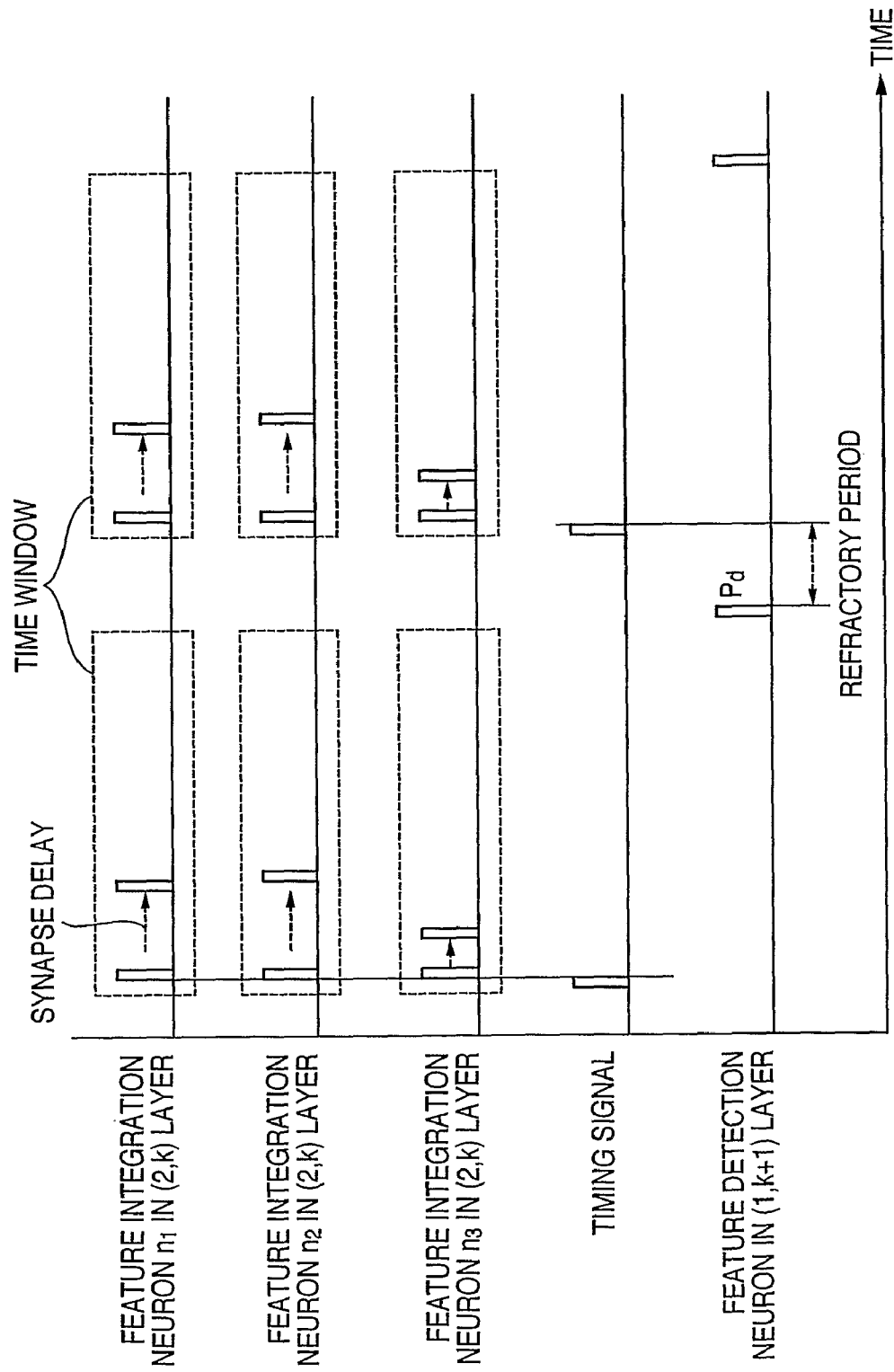

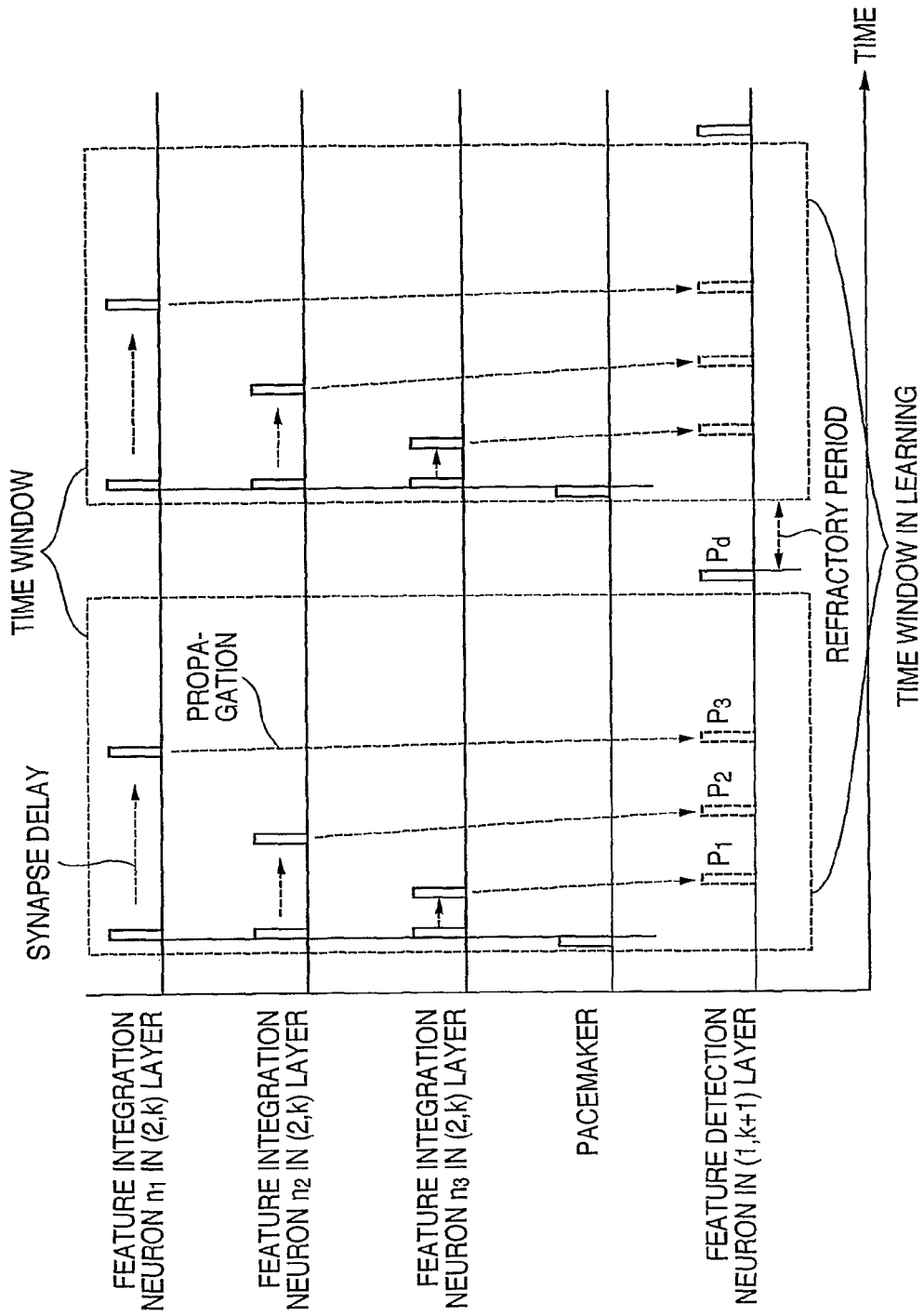

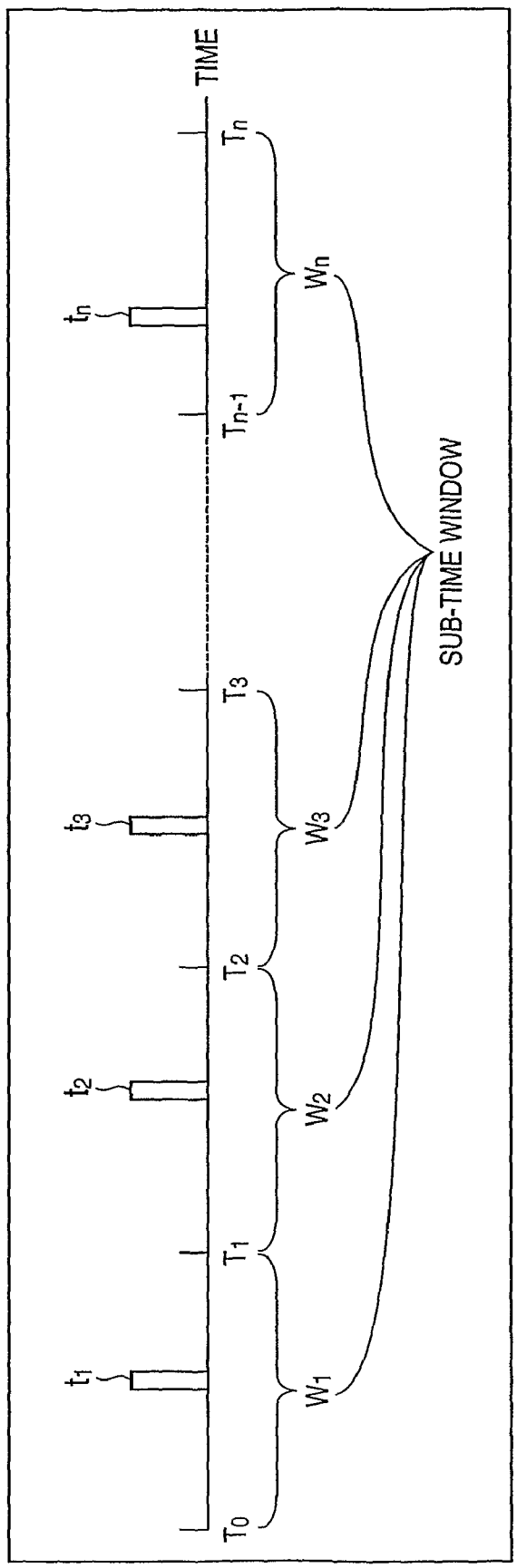

PARALLEL PULSE SIGNAL PROCESSING APPARATUS WITH PULSE SIGNAL PULSE COUNTING GATE, PATTERN RECOGNITION APPARATUS, AND IMAGE INPUT APPARATUS

TECHNICAL FIELD

The present invention relates to a parallel pulse signal processing circuit or neural network having a pattern recognition function.

BACKGROUND ART

As a scheme for implementing a large-scale neural network by small-scale circuits, an arrangement is conventionally known which executes time-sharing multiplexing by using a conventionally disclosed neuron model to generate a pulse signal (e.g., Japanese Patent Laid-Open No. 5-47870 and Japanese Patent No. 2679730). Another arrangement is also disclosed previously which can solve wiring problems by forming a neuron element by using an element to output a pulse train and a primary storage means (e.g., Japanese Patent Laid-Open No. 6-93249).

In the field of image recognition, a pattern recognition method (method to execute hierarchical template matching) is proposed which implements a recognition processing algorithm specialized to a specific recognition target by using a neural network model whose concept is obtained from the information processing mechanism of a living body (e.g., Japanese Patent Laid-Open No. 60-712, and Fukushima & Miyake, "1982 Neocognitron: A new algorithm for pattern recognition tolerant of deformation and shifts in position, Pattern Recognition, Vol. 15, pp. 455-469).

As an attempt to more faithfully adopt an information processing mechanism based on the neural network of a living body, a neural network model circuit is proposed which transmits and expresses information by a pulse train corresponding to an action potential (e.g., Murray et al., 1991 Pulse-Stream VLSI Neural Networks Mixing Analog and Digital Techniques, IEEE Trans. on Neutral Networks, Vol. 2, pp. 193-204, Japanese Patent Laid-Open Nos. 7-262157, 7-334478, and 8-153148, and Japanese Patent Nos. 2624143 and 2879670).

As a method of recognizing and detecting a specific target by a neural network formed from pulse train generation neurons, there is a scheme using a model of a high order (second or higher order) by Eckhorn et al. which is premised on linking inputs and feeding inputs (e.g., Eckhorn et al. 1990, Feature linking via synchronization among distributed assemblies: Simulation of results from cat cortex, Neural Computation, Vol. 2, pp. 293-307), i.e., a pulse coupled neural network (to be abbreviated as PCNN hereinafter) (e.g., U.S. Pat. No. 5,664,065, and Broussard, et al. 1999, Physiologically Motivated Image Fusion for Object Detection using a Pulse Coupled Neural Network, IEEE Trans. on Neural Networks Vol. 10, pp. 554-563).

Of the neural networks according to the prior arts, the arrangement which executes time-sharing multiplexing has a problem that the processing time increases along with an increase in number of synapse connections. The remaining arrangements can hardly be implemented as an electronic circuit because the increase in circuit scale and the wiring problems become conspicuous as the number of synapse connections increases, and the dynamic range of information (e.g., weight sum value) to be held increases as signals are added through synapse connections.

DISCLOSURE OF INVENTION

The present invention has been made in consideration of the above-described problems, and has as its object to solve the wiring problems and reduce the circuit scale and power consumption.

In order to achieve an object of the present invention, for example, a parallel pulse signal processing apparatus of the present invention comprises the following arrangement.

That is, a parallel pulse signal processing apparatus including a plurality of pulse output arithmetic elements, a plurality of connection elements which parallelly connect predetermined elements of the arithmetic elements, and a gate circuit which selectively passes pulse signals from the plurality of connection elements, characterized in that the arithmetic element comprises input means for inputting a plurality of time series pulse signals, modulation processing means for executing predetermined modulation processing on the basis of the plurality of time series pulse signals which are input, and pulse output means for outputting a pulse signal on the basis of a result of modulation processing, and the gate circuit selectively passes, of the signals from the plurality of connection elements, a finite number of pulse signals corresponding to predetermined upper output levels.

In order to achieve an object of the present invention, for example, a parallel pulse signal processing apparatus of the present invention comprises the following arrangement.

That is, a parallel pulse signal processing apparatus which hierarchically executes a plurality of arithmetic processing operations, characterized by comprising:

a plurality of arithmetic elements which receive signals from different layer levels and outputs predetermined pulse signals by a predetermined local receptor field structure; and a gate circuit element which selectively passes the pulse signals from the plurality of arithmetic elements belonging to a predetermined receptor field in accordance with a signal level of the pulse signal.

In order to achieve an object of the present invention, for example, a parallel pulse signal processing apparatus of the present invention comprises the following arrangement.

That is, a parallel pulse signal processing apparatus including input means for inputting data in a predetermined dimension, a plurality of data processing means, a gate circuit which selectively passes signals from the data processing means, and output means for outputting a result of pattern detection, characterized in that the data processing means includes a plurality of arithmetic elements parallelly connected by predetermined connection means, the arithmetic element included in the data processing means outputs a pulse-shaped signal train representing a detection result of a pattern of a predetermined category on the basis of an arrival time pattern of a plurality of pulses from predetermined arithmetic elements input in a predetermined time window, and the output means outputs the detection result of the predetermined pattern in the data on the basis of the outputs from the arithmetic elements.

In order to achieve an object of the present invention, for example, a parallel pulse signal processing apparatus of the present invention comprises the following arrangement.

That is, a parallel pulse signal processing apparatus including input means for inputting data in a predetermined dimension, a plurality of data processing means for outputting pulse signals, a gate circuit which selectively passes signals from the data processing means, and output means for outputting a result of pattern detection, characterized in that the data processing means includes a plurality of arithmetic elements parallelly connected by predetermined connection means, the gate circuit selectively passes the pulse signals on the basis of signal levels of the pulse signals from the plurality of data processing means, the arithmetic elements receive a time series pulse signal, identify time series pulse signal patterns of a plurality of classes, and output a pulse-shaped signal train unique to an arrival time pattern of a plurality of predetermined pulse signals input in a predetermined time window, and the output means outputs the detection result of the predetermined pattern in the data on the basis of the outputs from the arithmetic elements.

In order to achieve an object of the present invention, for example, a parallel pulse signal processing apparatus of the present invention comprises the following arrangement.

That is, a parallel pulse signal processing apparatus which hierarchically executes a plurality of arithmetic processing operations, characterized by comprising:

input means for inputting one of an intermediate result of different layer levels and data from a predetermined memory;

a plurality of data processing means, having a feature detection layer which detects a plurality of features from the data input by the input means, for outputting pulse signals; and a timing signal generation circuit, the data processing means further comprising a plurality of arithmetic elements which receive detection signals of the features of different types from a layer level of a preceding stage and output predetermined pulse signals, and a gate circuit which selectively passes outputs from the arithmetic elements involved in the plurality of predetermined features, wherein the arithmetic elements output pulse-shaped signals at one of a frequency and a timing based on a plurality of input signals from the timing signal generation circuit and an arrival time pattern of a plurality of pulses in a predetermined time window.

In order to achieve an object of the present invention, for example, a pattern recognition apparatus of the present invention comprises the following arrangement.

That is, a pattern recognition apparatus characterized by comprising the parallel pulse signal processing apparatus.

In order to achieve an object of the present invention, for example, an image input apparatus of the present invention comprises the following arrangement.

That is, an image input apparatus characterized in that pattern recognition is executed by using the parallel pulse signal processing apparatus, and input control of a predetermined image signal is executed on the basis of the pattern recognition result.

In order to achieve an object of the present invention, for example, a control method of a parallel pulse signal processing apparatus of the present invention comprises the following arrangement.

That is, a control method of a parallel pulse signal processing apparatus comprising a plurality of pulse output arithmetic elements, a plurality of connection elements which parallelly connect predetermined arithmetic elements, and a gate circuit which selectively passes pulse signals from the plurality of connection elements, characterized in that the arithmetic element inputs a plurality of time series pulse signals, executes predetermined modulation processing on the basis of the plurality of time series pulse signals which are input, and outputs a pulse signal on the basis of a result of modulation processing, and the gate circuit selectively passes, of the signals from the plurality of connection elements, a finite number of pulse signals corresponding to predetermined upper output levels.

In order to achieve an object of the present invention, for example, a control method of a parallel pulse signal processing apparatus of the present invention comprises the following arrangement.

That is, a control method of a parallel pulse signal processing apparatus which hierarchically executes a plurality of arithmetic processing operations, characterized by comprising:

causing a plurality of arithmetic elements to receive signals from different layer levels and output predetermined pulse signals by a predetermined local receptor field structure; and causing a gate circuit element to selectively pass the pulse signals from the plurality of arithmetic elements belonging to a predetermined receptor field in accordance with a signal level of the pulse signal.

In order to achieve an object of the present invention, for example, a control method of a parallel pulse signal processing apparatus of the present invention comprises the following arrangement.

That is, a control method of a parallel pulse signal processing apparatus comprising input means for inputting data in a predetermined dimension, a plurality of data processing means, a gate circuit which selectively passes signals from the data processing means, and output means for outputting a result of pattern detection, characterized by comprising causing each of a plurality of arithmetic elements, which are included in the data processing means and parallelly connected by predetermined connection means, to output a pulse-shaped signal train representing a detection result of a pattern of a predetermined category on the basis of an arrival time pattern of a plurality of pulses from predetermined arithmetic elements input in a predetermined time window, and causing the output means to output the detection result of the predetermined pattern in the data on the basis of the outputs from the arithmetic elements.

In order to achieve an object of the present invention, for example, a control method of a parallel pulse signal processing apparatus of the present invention comprises the following arrangement.

That is, a control method of a parallel pulse signal processing apparatus comprising input means for inputting data in a predetermined dimension, a plurality of data processing means for outputting pulse signals, a gate circuit which selectively passes signals from the data processing means, and output means for outputting a result of pattern detection, characterized by comprising causing the gate circuit to selectively pass the pulse signals on the basis of signal levels of the pulse signals from the plurality of data processing means, causing a plurality of arithmetic elements, which are included in the data processing means and parallelly connected by predetermined connection means, to receive a time series pulse signal, identify time series pulse signal patterns of a plurality of classes, and output a pulse-shaped signal train unique to an arrival time pattern of a plurality of predetermined pulse signals input in a predetermined time window, and causing the output means to output the detection result of the predetermined pattern in the data on the basis of the outputs from the arithmetic elements.

In order to achieve an object of the present invention, for example, a control method of a parallel pulse signal processing apparatus of the present invention comprises the following arrangement.

That is, a control method of a parallel pulse signal processing apparatus which hierarchically executes a plurality of arithmetic processing operations, the parallel pulse signal processing apparatus comprising input means for inputting one of an intermediate result of different layer levels and data from a predetermined memory, a plurality of data processing means, having a feature detection layer which detects a plurality of features from the data input by the input means, for outputting pulse signals, and a timing signal generation circuit, characterized by comprising, under the control of the data processing means, causing a plurality of arithmetic elements to receive detection signals of the features of different types from a layer level of a preceding stage and output predetermined pulse signals, and causing a gate circuit element to selectively pass outputs from the arithmetic elements involved in the plurality of predetermined features, and causing the arithmetic elements to output pulse-shaped signals at one of a frequency and a timing based on a plurality of input signals from the timing signal generation circuit and an arrival time pattern of a plurality of pulses in a predetermined time window.

In order to achieve an object of the present invention, for example, a control method of a pattern recognition apparatus of the present invention comprises the following arrangement.

That is, a control method of a pattern recognition apparatus characterized by comprising the parallel pulse signal processing apparatus.

In order to achieve an object of the present invention, for example, a control method of an image input apparatus of the present invention comprises the following arrangement.

That is, a control method of an image input apparatus characterized by comprising executing pattern recognition by using the parallel pulse signal processing apparatus, and executing input control of a predetermined image signal on the basis of the pattern recognition result.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 7A is a view conceptually showing the connection relationship between synapse circuits and neuron circuits;

FIG. 8B is a timing chart schematically showing a state in which postsynapse signals are parallelly time-window-integrated (a plurality of time window integration operations are executed in almost the same time zone) in parallelly executing time window integration of pulse signals which have passed through the gate circuit 5;

FIG. 8D is a timing chart showing the timing of pulse propagation from feature integration neurons $n_1$, $n_2$, and $n_3$ (the neurons express features of different kinds) on a layer (2,k) to a feature detection neuron ($n'_j$) (the neuron executes upper feature detection) on a layer (1,k+1) after a timing signal is input to a feature integration layer neuron;

FIG. 11A is a timing chart showing a plurality of pulses corresponding to different feature elements which are input to the feature detection neuron in detecting high-order graphic information by a pulse internal pattern used in the second embodiment;

FIG. 11B is a timing chart showing an example of a weight function distribution in processing the plurality of pulses corresponding to different feature elements which are input to the feature detection neuron in detecting high-order graphic information by the pulse internal pattern used in the second embodiment;

BEST MODE FOR CARRYING OUT THE INVENTION

Preferred embodiments of the present invention will now be described in detail in accordance with the accompanying drawings.

First Embodiment

Outline of Overall Arrangement

Figure 1:
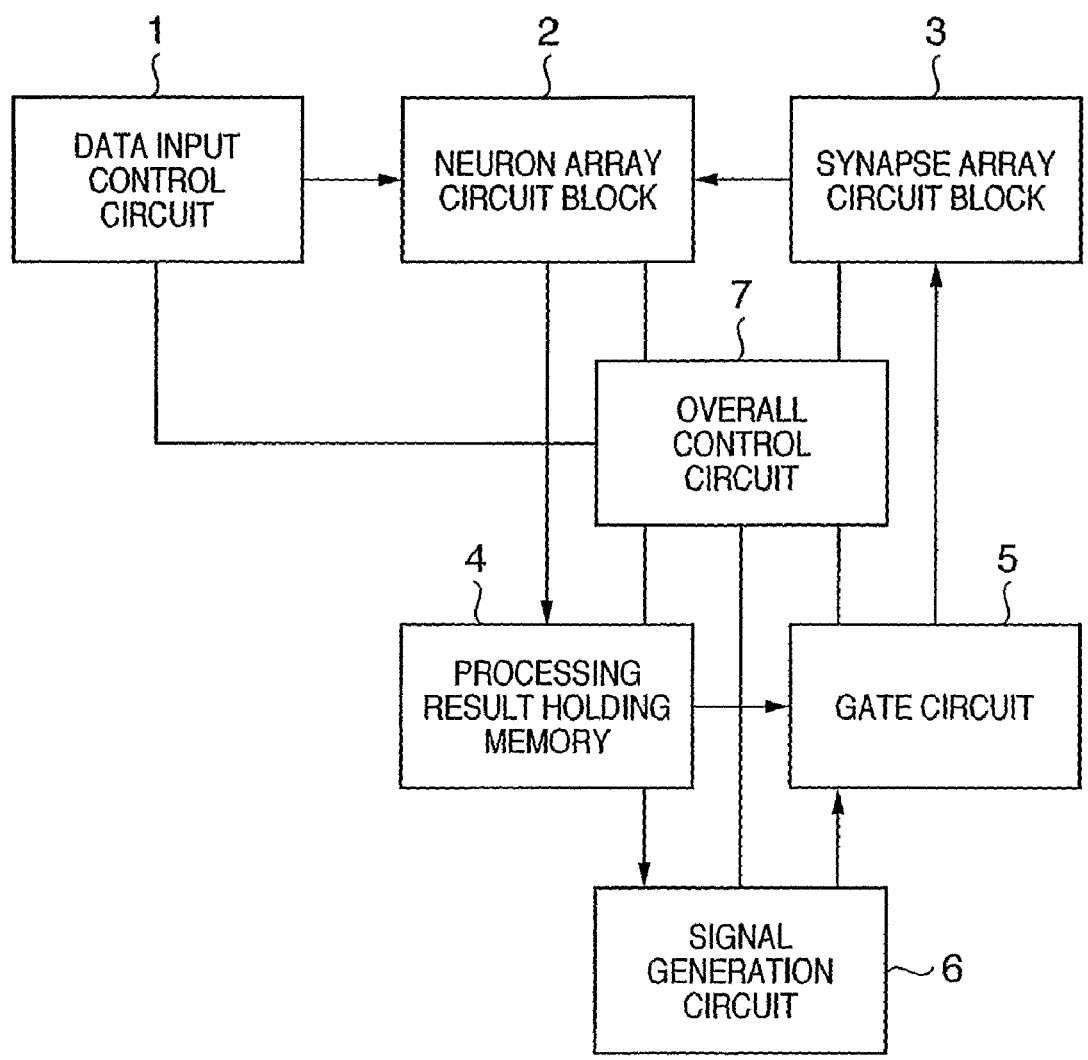
FIG. 1 is a block diagram showing the arrangement of the main part of a parallel pulse signal processing apparatus.

FIG. 1 shows the arrangement of the main part of a parallel pulse signal processing apparatus. The parallel pulse signal processing apparatus includes, as main constituent elements, a data input control circuit 1, neuron array circuit block 2, synapse array circuit block 3, processing result holding memory 4, gate circuit 5, signal generation circuit 6, and overall control circuit 7.

Figure 4:
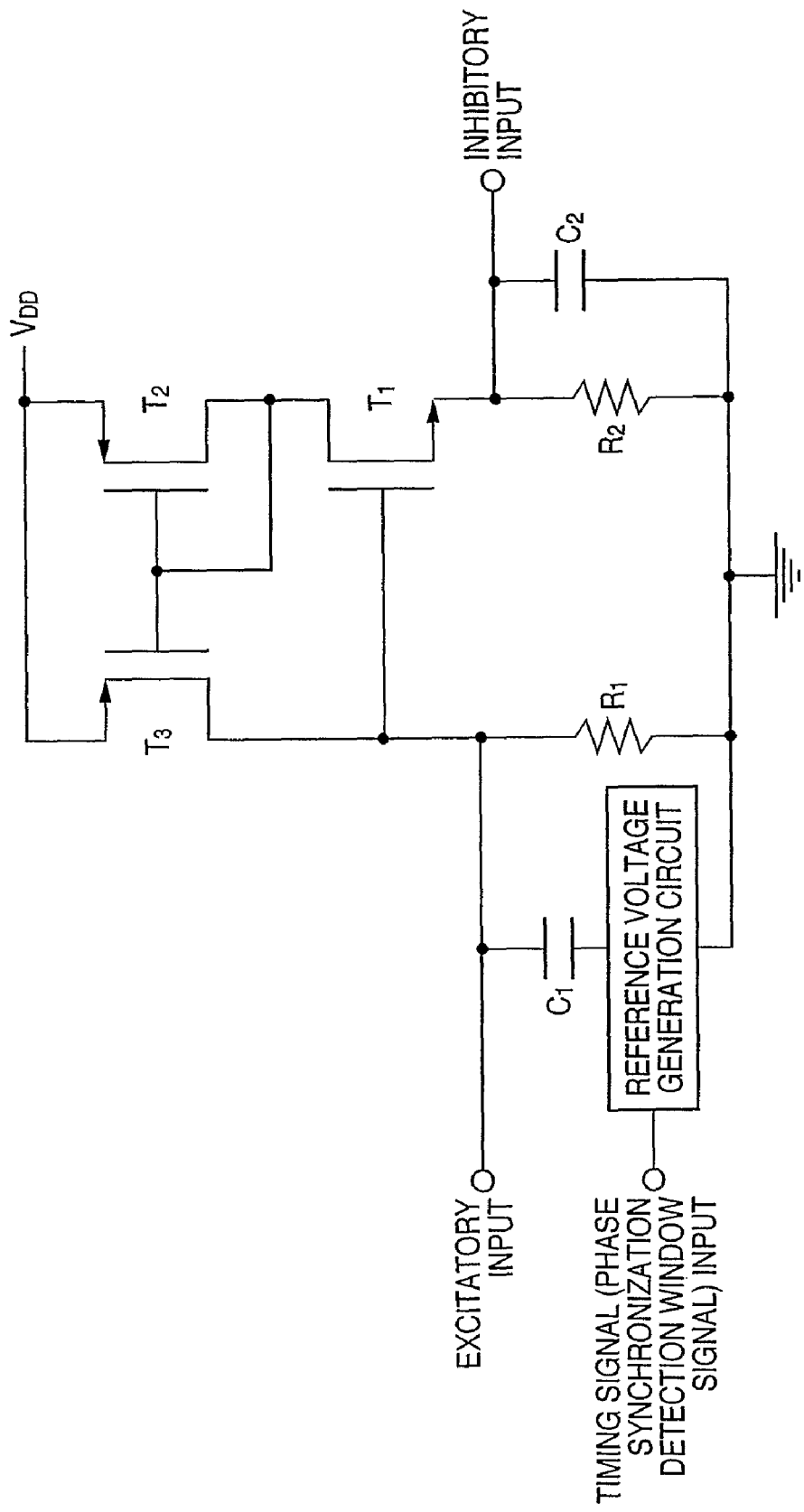
FIG. 4 is a circuit diagram showing the arrangement of a synapse circuit.

Referring to FIG. 1, the data input control circuit 1 is a control circuit to input image data or the like from a sensor or database and incorporates a primary memory. In the neuron array circuit block 2, a plurality of neuron circuits belonging to a predetermined layer in a hierarchical processing structure as shown in FIG. 4 are arrayed. In this embodiment, one layer (or a neuron involved in detecting one feature class in one layer) of a multilayered neural network is implemented in an arbitrary time zone by using the neuron array circuit block 2 and synapse array circuit block 3. A neuron belonging to another layer (or a neuron involved in detecting another feature class) is implemented in another time zone.

In the synapse array circuit block 3, synapse connection circuits between neurons are arranged in a two-dimensional array. A case in which synapse connections are present between different layers will be described. The synapse array circuit block 3 implements a synapse connection to at least one layer level.

For the synapse array circuit block 3, the connection structure to a neuron circuit in the neuron array circuit block 2 is controlled by the overall control circuit 7. The overall control circuit 7 stores receptor field structure data corresponding to a feature class in the internal memory (not shown). The receptor field structure data will be described later. The processing result holding memory 4 temporarily holds the output from the neuron array circuit block 2.

The signal generation circuit 6 supplies the output signal from the neuron array to the synapse array circuit block 3. The overall control circuit 7 controls the operations of the respective circuit blocks to control signal input/output from a lower layer to an upper layer in the multilayered neural network. That the data which stores the receptor field structure data is stored in the internal memory of the overall control circuit 7 does not provide the major function of this embodiment.

Hence, the means for storing the receptor field structure data may be implemented by an arrangement different from that shown in FIG. 1, and for example, an external memory of the parallel pulse signal processing apparatus or a memory added to the arrangement shown in FIG. 1 as a part of the parallel pulse signal processing apparatus.

Figure 2:
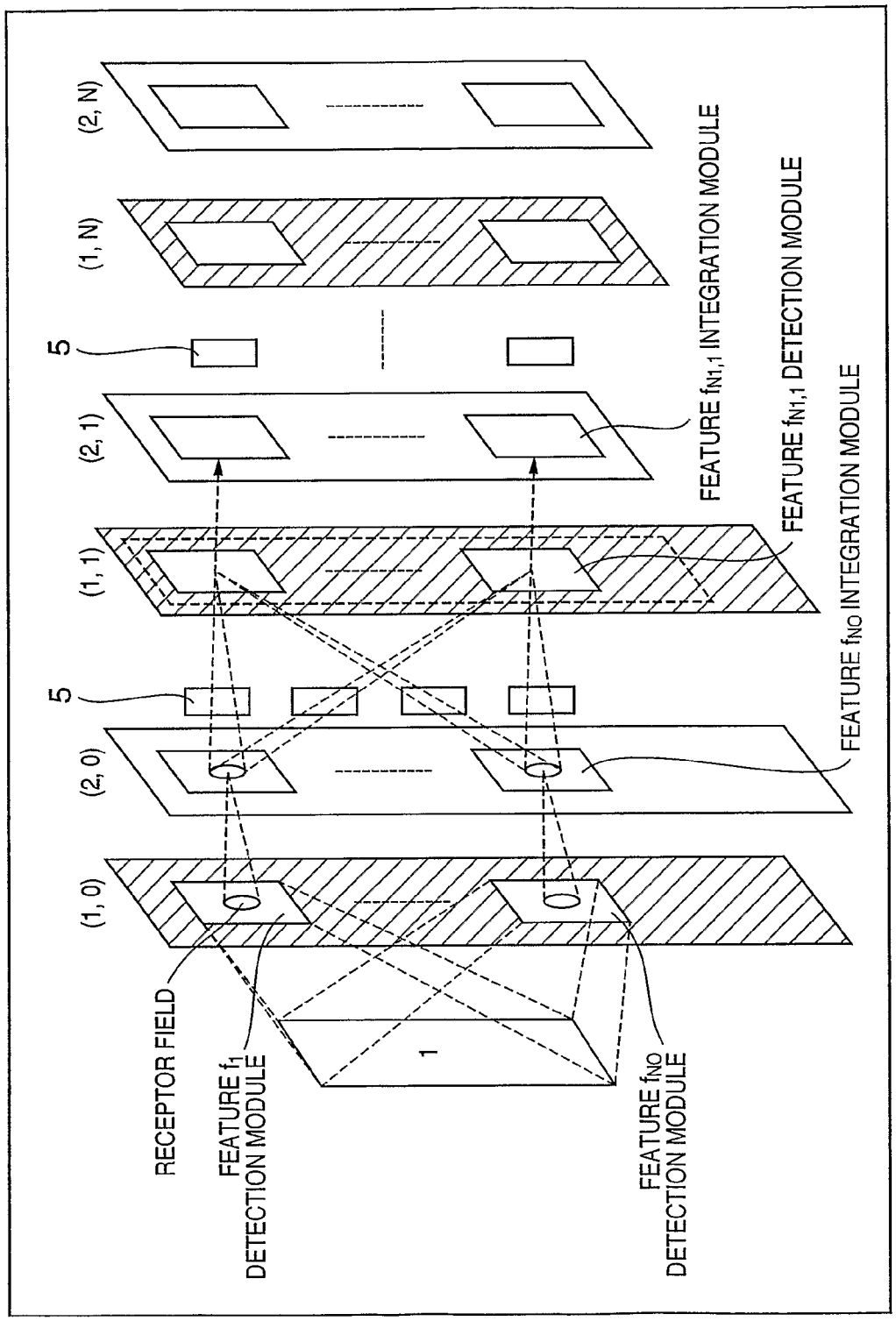
FIG. 2 is a view conceptually showing the overall arrangement of a network.

FIG. 2 is a view conceptually showing the overall arrangement of a network implemented by the parallel pulse signal processing. When the multilayered neural network conceptually shown in FIG. 2 should be mounted as an analog-digital mixed or merged circuit, it is often difficult to implement parallel processing by parallelly arranging all the constituent elements such as neurons and synapses on a two-dimensional plane. In this embodiment, time-sharing processing is executed by using a few neurons or synapse circuit elements.

The network shown in FIG. 2 mainly processes information necessary for recognizing and detecting a target (or its geometrical feature) given as an image. The basic structure of the network is a so-called convolutional network structure (reference 1: LeCun, Y. and Bengio, Y., 1995, "Convolutional Networks for Images Speech and Time Series", in Handbook of Brain Theory and Neural Networks (M. Arbib. Ed.), MIT press, pp. 255-258) having a hierarchical structure.

This embodiment is different from the conventional basic structure in that a synapse connection circuit and a gate circuit (to be described later) are used for the interlayer connection between a feature detection layer and a feature integration layer (to be described later). The final output (uppermost layer output) of this network is a recognition result, i.e., the category of the detected target and position information on the input data. The outline of each element shown in FIG. 2 will be described below.

In an image sensor means, the data input layer 1 includes a photoelectric conversion element such as a CMOS sensor or CCD element. The feature detection layer (1,0) detects low-order features from input image data and detects, at each position all over the window (or at each of predetermined sampling points all over the window), local low-order features (the features may include color component features in addition to geometrical features) of the image pattern equal in number to a plurality of feature categories at a plurality of scale levels or resolutions at the same position by multiple resolution processing such as Gabor wavelet transform.

Each neuron element of the feature detection layer has a receptor field structure corresponding to the type of the feature amount (e.g., the tilt of a line segment as a geometrical structure when a line segment in a predetermined direction is detected as a geometrical feature) and generates a pulse train corresponding to its degree.

Feature detection layers (1,k) form a processing channel for a plurality of resolutions (or scale levels) as a whole ($k \geq 0$). Assume that Gabor wavelet transform is executed by the feature detection layer (1,0). In this case, a set of feature detection neurons which have, in their receptor field structures, Gabor filter kernels having the same scale level and different directional selectivities form one processing channel in the feature detection layer (1,0). Even in a subsequent feature detection layer (1,1), feature detection neurons (the neurons detect higher-order features) which receive the outputs from those feature detection neurons belong to the same channel as the processing channel.

For a detailed method of executing Gabor wavelet transform in a neural network, see reference 2: Daugman (1988), "IEEE Trans. on Acoustics, Speech, and Signal Processing, Vol. 36, pp. 1169-1179".

Even in another subsequent feature detection layer (1,k) ($k>1$), feature detection neurons which receive the outputs from a plurality of feature integration neurons which form the same channel in a feature integration layer (2,k−1) belong to the same channel. In each processing channel, processing progresses at the same scale level (or resolution). Detection and recognition of low- to high-order features are executed by hierarchical parallel processing.

Features detected by different processing channels at the same layer level (detected features have the same complexity level) belong to the same category, although they are detected at different scales. For example, consider an "eye" pattern in a face as a middle-order feature. "Eyes" having different sizes are detected by the respective channels. That is, the plurality of processing channels having different scale level selectivities attempt to detect the "eye" with a given size in the image.

A feature integration layer will be described next.

In feature integration layers (2,0), (2,1), ..., each neuron element receives the input from the feature detection layer (1,0). The neuron element has the above-described predetermined receptor field structure (the receptor field will indicate the connection range to the output element of the immediately preceding layer, and the receptor field structure will indicate the distribution of the connection weight hereinafter) for sub-sampling. More specifically, the feature integration layer executes arithmetic processing such as local averaging by integrating a plurality of neuron element outputs in the same receptor field from the feature detection layer (1,0) or representative value extraction (sub-sampling) by detecting a maximum value in a local region.

The receptor fields of image feature portion neurons in a feature integration layer have a structure which is common to the neurons in that same layer. Each of the feature detection layers (1,1), (1,2), ..., (1,N), and feature integration layers (2,1), (2,2), ..., (2,N) has a predetermined receptor field structure. Like the above-described layers, the former ((1,1), ...) detects a plurality of different features in the feature detection modules. The latter ((2,1), ...) integrates the detection results for the plurality of features from the feature detection layer of the preceding stage. The feature detection layers are connected (wired) to receive the neuron element outputs of preceding feature integration layers belonging to the same channel.

The gate circuit 5 will be described next.

The gate circuit 5 selectively passes, of the outputs from the plurality of neuron elements in same layer, a pulse signal with a high output level. A gate circuit which selectively passes the output from a feature integration layer is related to a feature detection layer neuron of the subsequent stage. This gate circuit selectively passes a signal of an upper output level of the feature integration layer neuron outputs for each low-order feature class received by the feature detection layer neuron. The gate circuit function of selectively passing an output from a feature detection layer to a feature integration layer is implemented by the sub-sampling function executed by the feature integration layer neuron of the subsequent stage without using the gate circuit 5 shown in FIG. 1.

The gate circuit 5 will be described below assuming that it selectively passes an upper-level output signal of the output signals from the feature integration layer to the feature detection layer (the signal may take the maximum value of the output distribution and have the upper level of the maximum value).

The gate circuit 5 detects the signal levels of pulse signal outputs from the feature integration layer neurons which belong to a predetermined feature class (lower-level) in the receptor field of the feature detection layer neuron and passes k (k is a natural number) upper output level signals (e.g., from the maximum level to kth level from top) per feature class.

When the feature detection layer neuron needs to detect a plurality of features (their positions on the input data are different) belonging to the same feature class, a given number obtained by multiplying the necessary number of local features by k or a number close to the given number is used. In addition, the gate circuit has a function of selecting an upper signal of output signals which take the maximum value of the feature integration layer neuron outputs of that feature class. This function can be implemented by a predetermined WTA (Winner Take All) circuit (e.g., reference 3: G. Indiveri (2001), "A Neuromorphic VLSI Device for Implementing 2-D Selective Attention Systems", IEEE Trans. on Neural Networks, Vol. 12, pp. 1455-1463). In this case, a signal of peak level of clusters obtained by feature integration layer neuron outputs belonging to a specific feature class is selected. The maximum value or a signal near it may be selected.

In this embodiment, at least one gate circuit having the above-described function is set between the feature integration layer and the feature detection layer of the subsequent stage for each feature class present in the feature integration layer.

Figure 13:
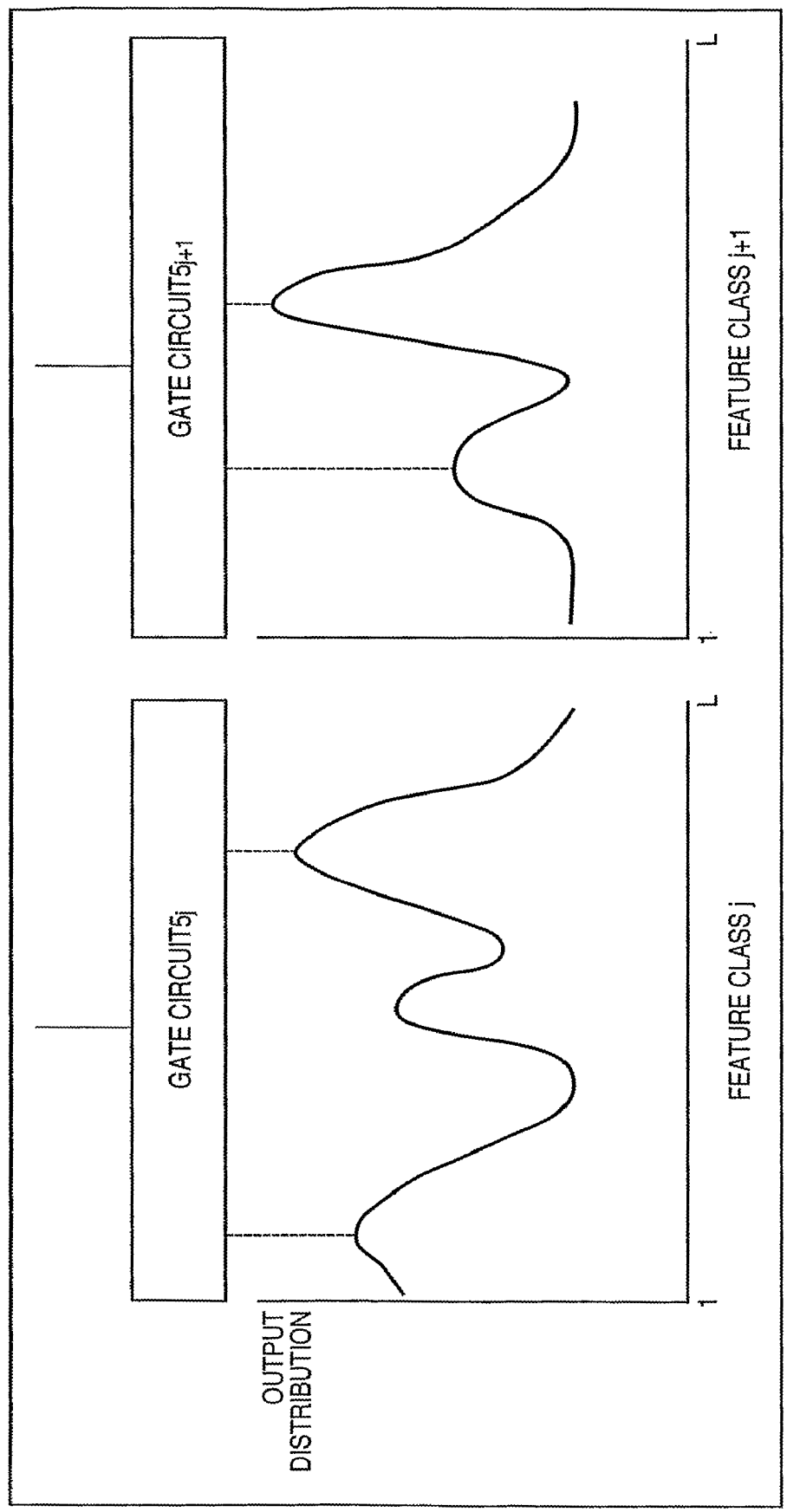
FIG. 13 is a graph schematically showing a state in which the gate circuit selectively passes, of feature integration layer outputs, a maximum upper signal in each feature class.

FIG. 13 schematically shows a state in which for outputs from jth and (j+1)th feature classes of the feature integration layer, gate circuits 5j and 5j+1 corresponding to these feature classes selectively pass top two maximum value signals from the output distribution in each class. The selected portions are indicated by dotted lines in FIG. 13.

Figure 3A:
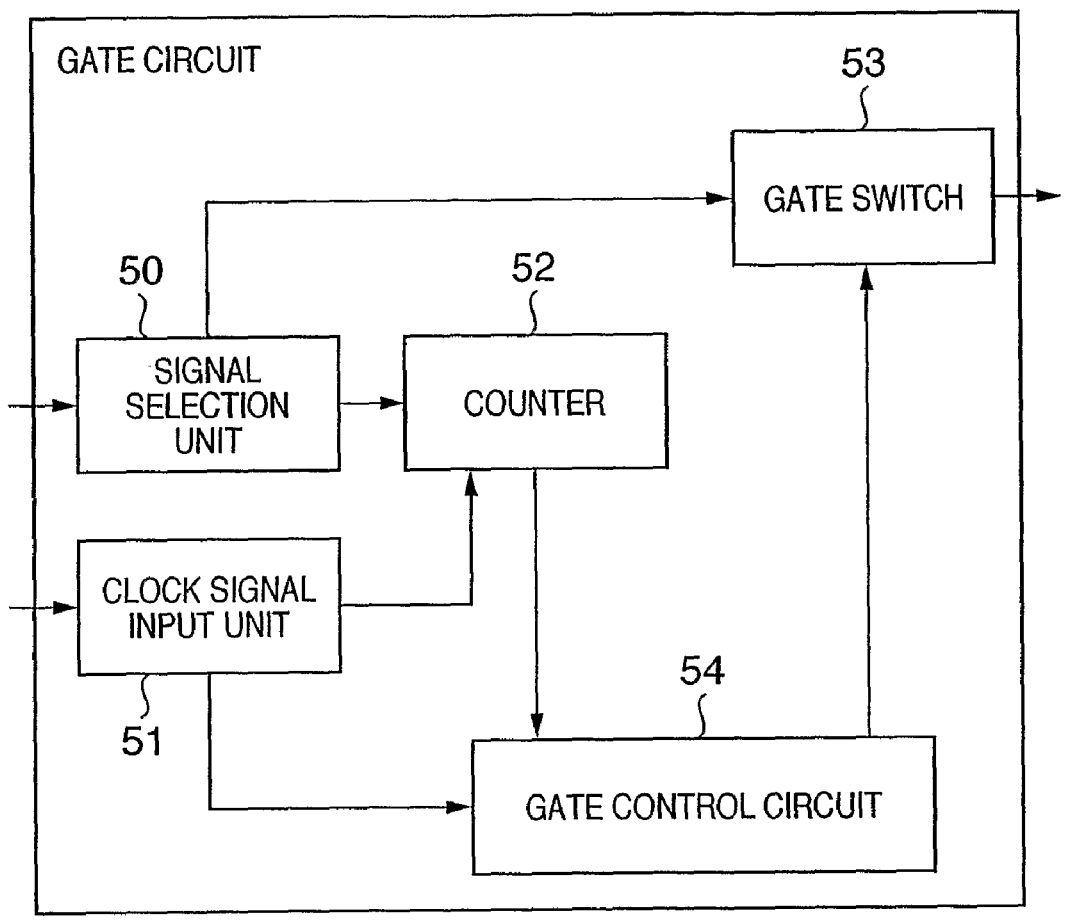
FIG. 3A is a block diagram showing the arrangement of a gate circuit 5.

FIG. 3A shows the arrangement of the gate circuit 5. The gate circuit 5 includes a signal selection unit 50, clock signal input unit 51, counter 52, gate switch 53, and gate control circuit 54. The signal selection unit 50 and clock signal input unit 51 receive signals from the layer of the preceding stage.

Of signals from the feature integration layer neurons belonging to the receptor field of the feature detection layer neuron corresponding to the gate circuit 5, only a signal which satisfies the above-described predetermined criterion is selectively received by the signal selection unit 50. For example, when the outputs from the feature integration layer neurons of the preceding stage are temporarily stored in the memory, a signal is selectively received by appropriately setting the memory address at which each neuron output belonging to the receptor field is stored (e.g., top k output signals are selected). A description will be done on the basis of this assumption.

The counter 52 of the gate circuit 5 counts the number of pulse signals selectively passed. The counter 52 is reset by the timing signal from the clock signal input unit 51. When the value of the counter 52 reaches a predetermined upper limit value, the gate control circuit 54 opens the gate switch 53, so no pulse signals are output to the layer of the subsequent stage from this time.

When parallel signal input to a feature detection layer should partially be executed in a time-sharing manner (for example, signals from a feature integration layer for receptor fields corresponding to ¼ of all feature detection neurons which detect a predetermined feature class are input at once), the control circuit selects a parallelly inputtable number of feature detection layer neurons whose receptor fields do not overlap. In this case, next, the signal selection unit 50 of the gate circuit 5 sets the memory address to store the feature integration layer neuron output corresponding to the receptor field of each feature detection layer neuron and reads each output data. In the input step after the above-described parallel input, signals are sequentially input from receptor fields different from those input in the preceding input step while holding the condition that the receptor fields do not overlap each other.

When the number k of signals to be passed is 1, the signal selection unit 50 of the gate circuit generally has the function of a so-called winner take all (WTA) circuit. When the output from the feature integration layer is a phase-modulated pulse signal, the signal level is detected on the basis of the delay amount from the reference time. The reference time is given by input of a clock pulse signal from a timing element in the overall control circuit 7.

The gate circuit 5 is not limited to the arrangement shown in FIG. 3A and only needs to have the above-described signal selection function. In the above description, one gate circuit is set for one feature class. Upper-level output signals (they may be maximum value signals) from a plurality of feature classes of the feature integration layer neuron may selectively be passed at once. In this case, a signal which is an upper-level signal in a feature class but is not an upper-level signal in all of the plurality of classes cannot pass through the gate circuit.

A synapse circuit serving as a connection means for neuron elements will be described next.

In this embodiment, the synapse circuit implements interlayer connection. As shown in FIG. 7A, the synapse circuit includes a signal transmission portion (interconnection or delay line) corresponding to the axon or dendrite of a neuron and synapse connection portions. FIG. 7A shows the arrangement of connection portions involved in output (or input when viewed from the neuron concerned) from neurons ($n_j$) of a feature integration (detection) neuron which form a receptor field for a certain feature detection (integration) neuron. Referring to FIG. 7A, each neuron element $n_j$ outputs a pulse signal train (spike train).

A so-called excitatory connection amplifies a pulse signal in the synapse circuit. Conversely, an inhibitory connection attenuates a pulse signal. When information is transmitted by a pulse signal, amplification and attenuation can be implemented by modulating the amplitude, pulse width, phase, or frequency of the pulse signal.

Figure 7B:
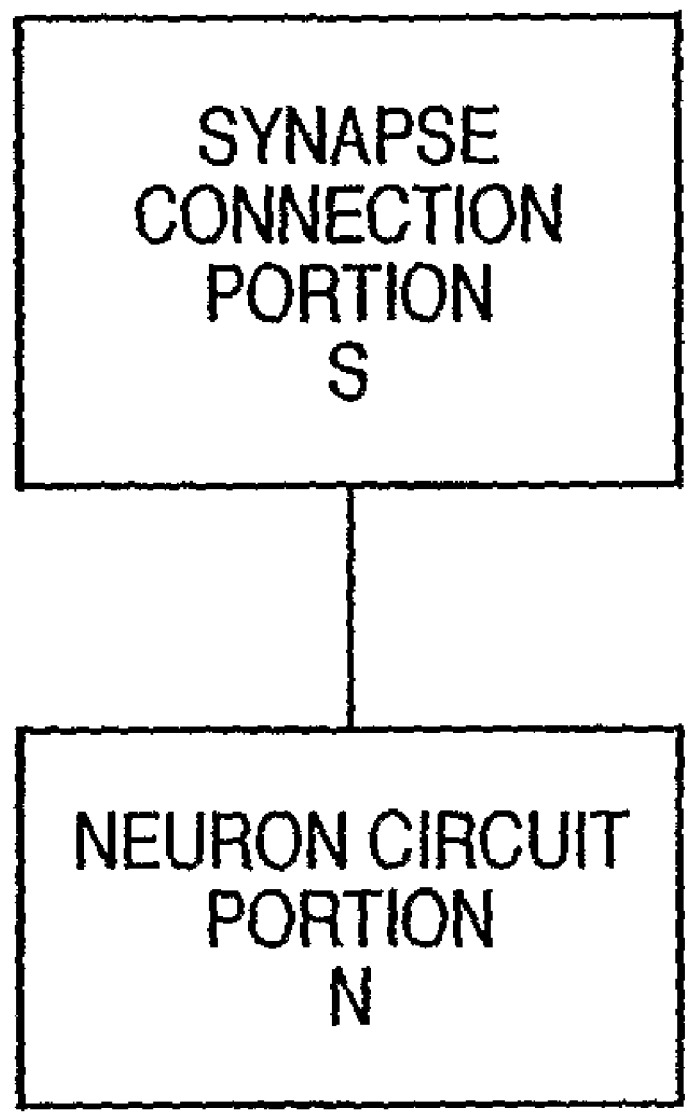
FIG. 7B is a block diagram conceptually showing the connection relationship between a synapse circuit and a neuron circuit.

In this embodiment, when a synapse connection portion S is used as a pulse phase modulation element, amplification of a signal is converted as an actual advance of pulse arrival time (or small phase delay amount). Attenuation is converted as an actual delay (or large phase delay amount). That is, qualitatively, the excitatory connection gives an advance of phase of an arriving pulse with respect to a reference phase, and the inhibitory connection gives a delay. As the synapse connection means, any other modulation method such as pulse width modulation or frequency modulation can be used (in this embodiment, the description will be made by using pulse phase modulation). The synapse connection portions and neuron elements may be put together to form circuit blocks as shown in FIG. 7B.

The neuron element included in each layer will be described next. Each neuron element serves as a pulse signal modulation output element which receives a pulse signal and outputs the pulse signal. For example, a so-called integrate-and-fire neuron which fires and outputs a pulse-like signal when a result obtained by spatio-temporally linearly adding an input signal (a pulse train corresponding to an actual potential) exceeds a threshold value, or a nonlinear conversion circuit which converts the phase or width of a pulse signal can be used.

An image feature portion neuron element of a feature detection layer (1,k+1) receives the outputs from neuron elements belonging to the plurality of feature classes of a feature integration layer (2,k).

On the other hand, a neuron element of a feature integration layer (2,k+1) receives the output from a feature detection layer neuron element belonging to the same feature class as the neuron element.

FIG. 4 shows an example of the basic arrangement representing the operation principle of the pulse generation circuit of a neuron element which is formed as an integrate-and-fire circuit. In this example, the circuit receives three kinds of inputs, i.e., the excitatory and inhibitory inputs from the feature integration layer or feature detection layer and a signal from the timing element in the overall control circuit 7. The third input signal is used to supply a time window generation timing (timing of the start of time integration of the input pulse signal) signal.

The time constant of a capacitor $C_1$ and resistor $R_1$ on the excitatory input side is smaller than that of capacitor $C_2$ and resistor $R_2$. In the steady state, transistors $T_1$, $T_2$, and $T_3$ are OFF. The resistor is actually comprised of an active load transistor.

When the potential of the capacitor $C_1$ increases and exceeds that of the capacitor $C_2$ by the threshold value of the transistor $T_1$, the transistor $T_1$ is activated, and then, the transistors $T_2$ and $T_3$ are activated. The transistors $T_2$ and $T_3$ form a current mirror circuit. The output from the circuit shown in FIG. 4 is output from an output circuit (not shown) on the side of the capacitor $C_1$. When the charge storage amount of the capacitor $C_2$ is maximized, the transistor $T_1$ is turned off. As a result, the transistors $T_2$ and $T_3$ are also turned off, and the positive feedback becomes 0.

In a so-called refractory period, the capacitor $C_2$ is discharged. Unless the potential of the capacitor $C_1$ is higher than that of the capacitor $C_2$ by the threshold value of the transistor $T_1$, the neuron does not respond. Periodical pulses are output by repeating alternate charge/discharge of the capacitors $C_1$ and $C_2$. The frequency of the pulse is generally determined in accordance with the level of the excitatory input. However, since the refractory period is present, the frequency may be limited to the maximum value, or a predetermined frequency may be output.

Instead of using the element having the integrate-and-fire function, a circuit may be used which outputs the internal state added with the postsynapse pulse signal in the form of a pulse signal modulated on the basis of the neuron activation function (e.g., sigmoid function).

A time window weight function generation circuit serves to control the pulse signal integration characteristic in the neuron element. This circuit temporally controls the potential of the capacitor (and charge storage amount). It is weighted summing in a time window (to be described later) for an input pulse that reflects the control characteristic (FIGS. 11A to 11D).

When a synapse weight value corresponds to the weight, the time window weight function generation circuit generates a weight function corresponding to the arrival time of the input pulse so that a value corresponding to the product between the signal level and the synapse weight value is obtained. More specifically, the function waveform is set such that the weight value to be multiplied decreases as the delay of the pulse arrival time increases. To generate the function waveform, an analog oscillation circuit is used. Alternatively, a digital waveform may be generated by a digital circuit using a lookup table method or function generation method and converted into an analog waveform by a D/A converter.

The reference voltage control circuit generates a reference voltage signal (corresponding to the weight function in FIG. 11B) on the basis of the input timing from the timing element (or cross-coupling input to a neuron of the subsequent layer).

Generally, the relationship between the sum and output level (pulse phase, pulse frequency, or pulse width) of input signals changes depending on the sensitivity characteristic of the neuron. The sensitivity characteristic can be changed by top-down input from the upper layer. For the descriptive convenience, assume that the circuit parameters are set such that the frequency of the pulse output corresponding to the input signal sum value steeply rises (hence, almost binary in the frequency domain), and the output level (e.g., the timing for giving phase modulation) varies by pulse phase modulation.

Since the reference voltage is controlled by the weight function in the time window by the output from the image feature portion neuron in the feature integration layer, the output characteristic (e.g., the phase of the pulse output) from the feature detection layer neuron changes. When phase modulation is executed, the phase can be used as the output level of the neuron.

The phase of the neuron output (presynapse) has such an output characteristic that the initial stage of the time window is defined as the reference, and the delay (phase) from the reference time is determined by the charge storage amount upon receiving a reference pulse (output from the timing element or the like). A detailed circuit arrangement to give such an output characteristic is not the gist of this embodiment and will be omitted. When the postsynapse pulse phase is obtained by adding the presynapse phase to the unique phase modulation amount given by the synapse, multiplication (normal arithmetic processing) of the synapse weight and presynapse signal is executed in the time window weight function (to be described later).

A known circuit arrangement may be used which outputs an oscillation output with a predetermined delay when the sum value of inputs obtained by using, e.g., a window function exceeds the threshold value.

As described above, the neuron of the feature detection layer has a receptor field structure corresponding to the feature category. When the weight sum value (to be described later) of the input pulse signal (current value or potential) from a neuron of the layer (input layer or feature integration layer) of the preceding stage by the time window function is equal to or larger than the threshold value, the neuron outputs a pulse (the pulse is given by a phase change; the frequency, amplitude, or pulse width may be changed) which takes a value of a nondecreasing nonlinear function such as a sigmoid function, i.e., a so-called squashing function which asymptotically saturates to a predetermined level in accordance with the sum value.

<Synapse Circuit Etc.>

FIG. 4 shows that sub-circuits each of which gives a synapse connection strength (the synapse connection strength indicates the magnitude of modulation related to phase delay) of a neuron ni to each neuron $n'_j$ as the connection destination in a synapse connection portion Si are arranged in a matrix.

Figure 9A:
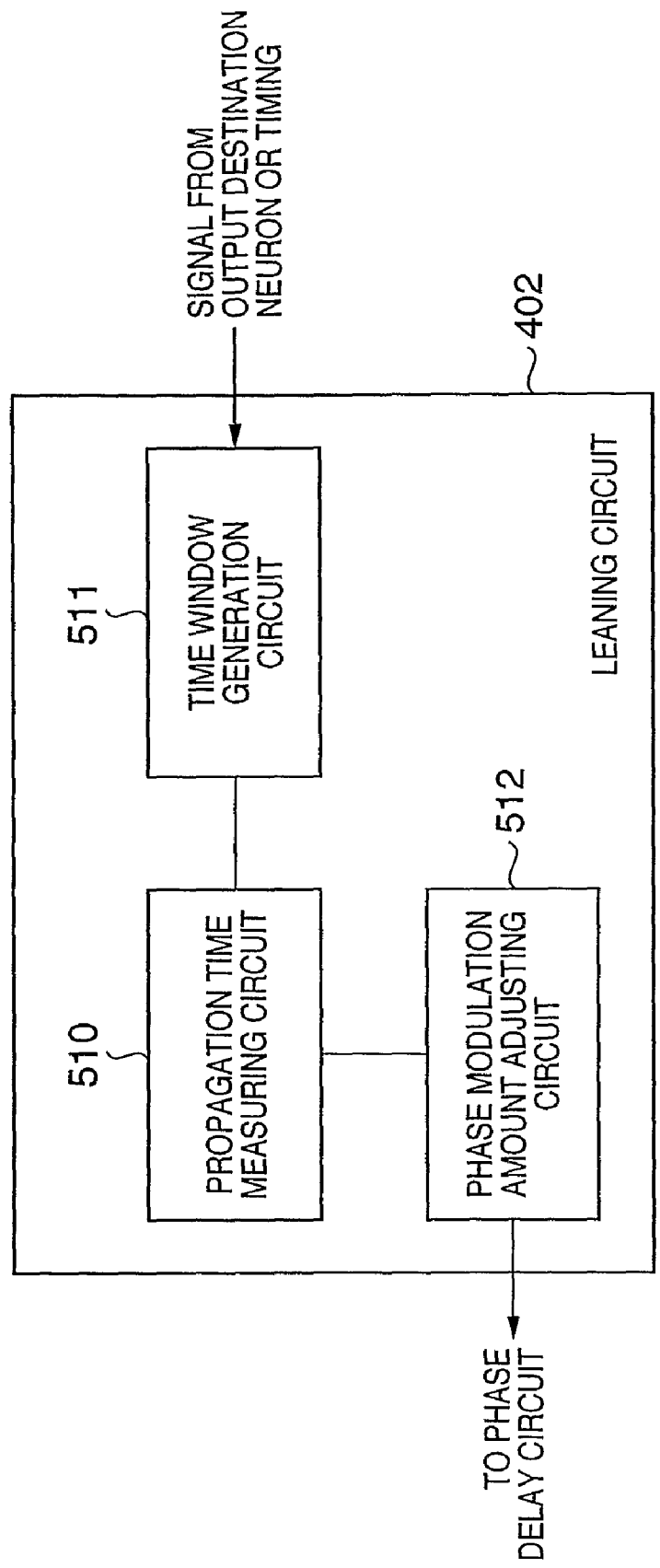
FIG. 9A is a block diagram showing the arrangement of a learning circuit.
Figure 9B:
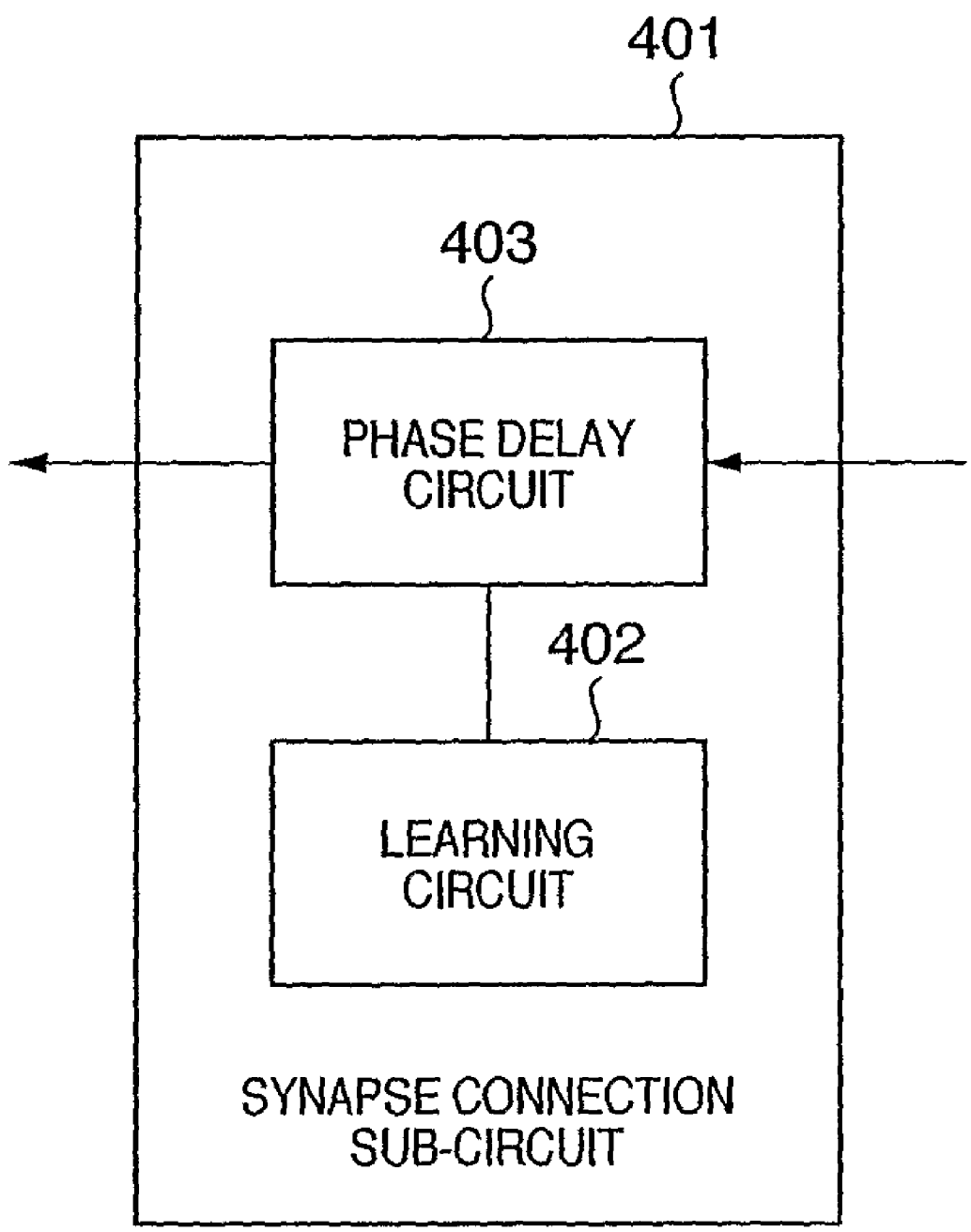
FIG. 9B is a block diagram showing the arrangement of a synapse circuit.

As shown in FIG. 9B, each synapse connection sub-circuit 401 includes a learning circuit 402 and phase delay circuit 403. The learning circuit 402 adjusts the delay amount by changing the characteristic of the phase delay circuit 403 and stores the characteristic value (or control value) in a floating gate element or a capacitor connected to a floating gate element.

Figure 10A:
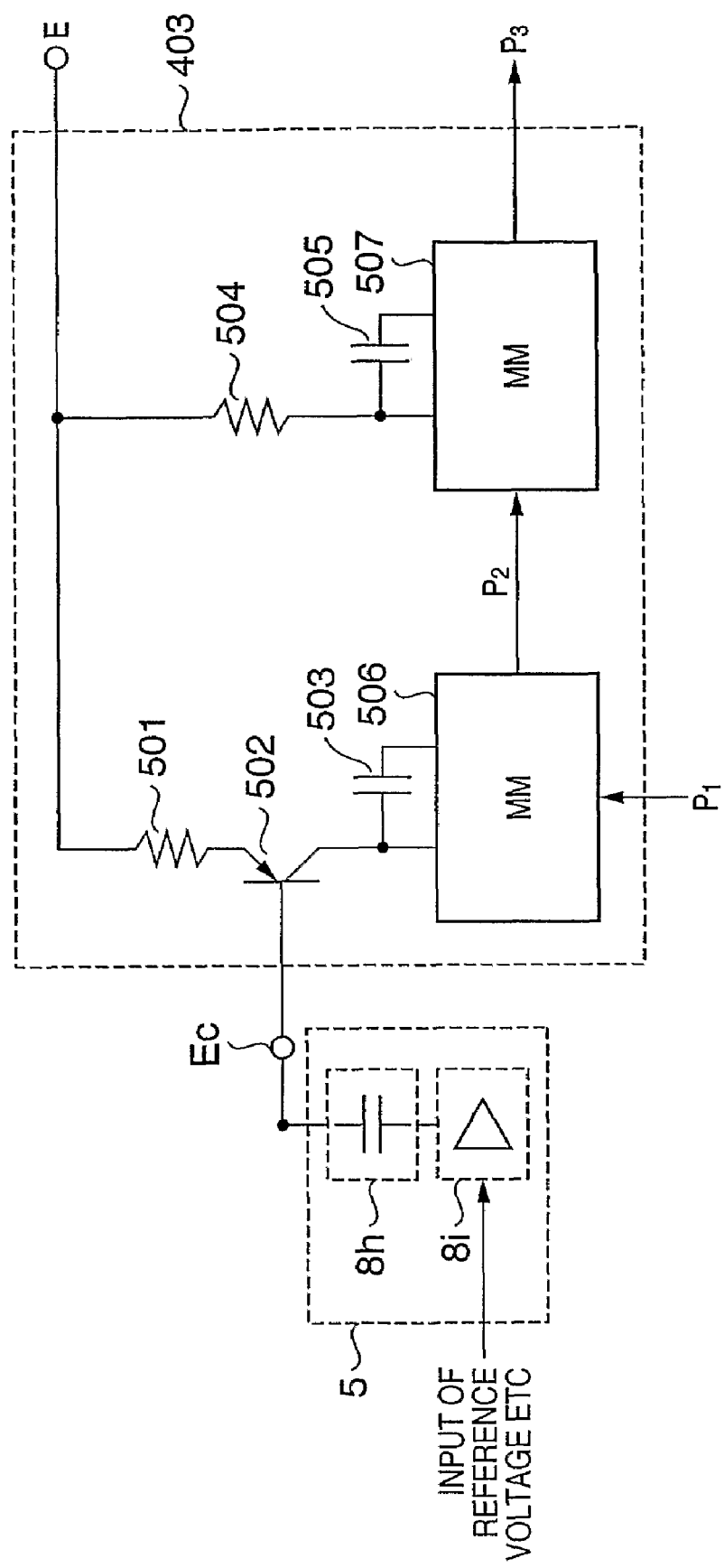
FIG. 10A is a block diagram showing the arrangement of a pulse phase modulation circuit.
Figure 10B:
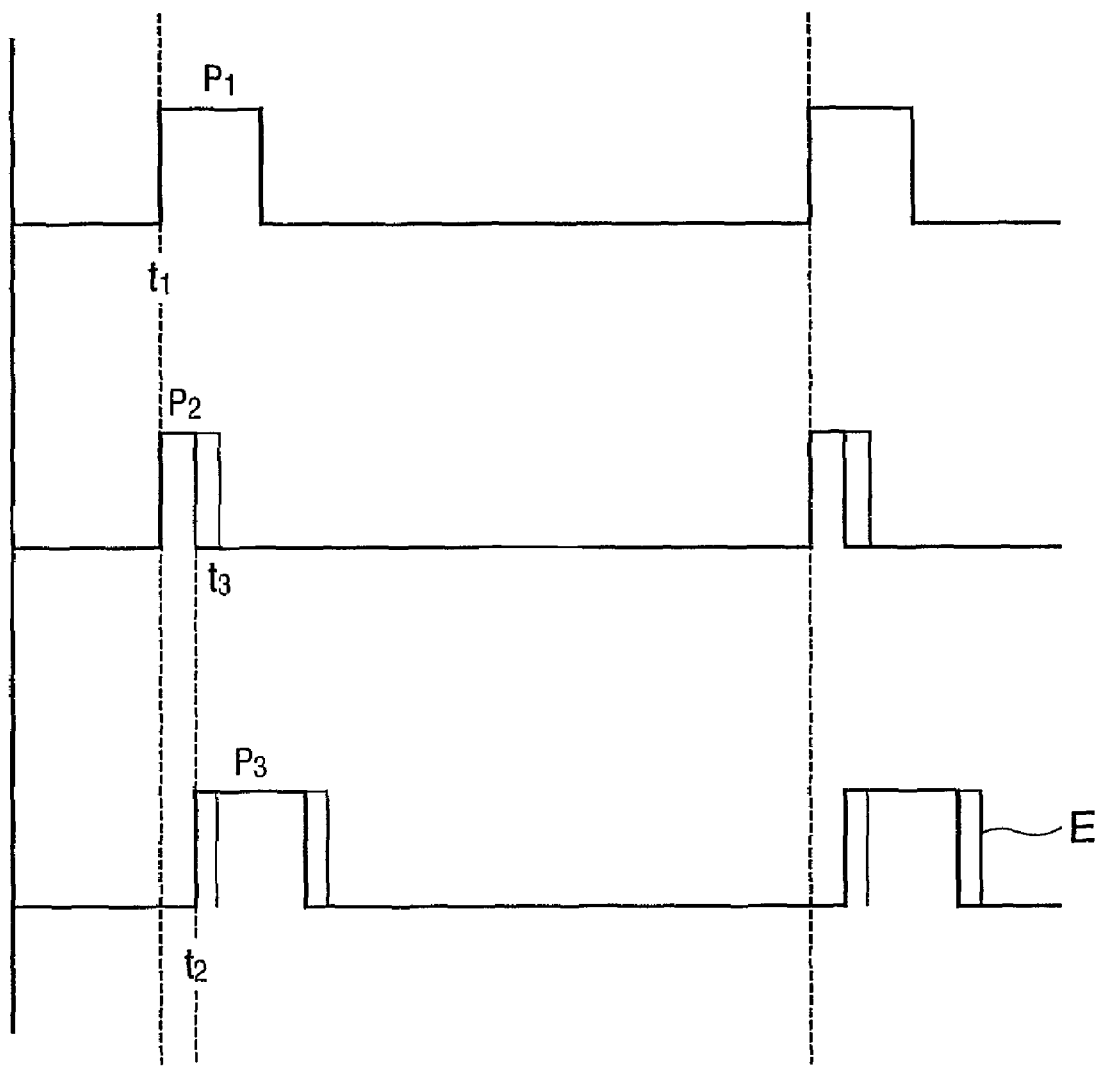
FIG. 10B is a timing chart showing the timings of a square wave P1 input to a monostable multivibrator 506, a square wave P2 output from the monostable multivibrator 506, and a square wave P3 output from a monostable multivibrator 507.

The phase delay circuit 403 is a pulse phase modulation circuit and can include, e.g., monostable multivibrators 506 and 507, resistors 501 and 504, capacitors 503 and 505, and transistor 502, as shown in FIG. 10A. FIG. 10B shows the timings of a square wave P1 input to the monostable multivibrator 506, a square wave P2 output from the monostable multivibrator 506, and a square wave P3 output from the monostable multivibrator 507.

A detailed description of the operation mechanism of the phase delay circuit 403 will be omitted. The pulse width of the square wave P1 is determined by the time until the voltage of the capacitor 503 by a charge current reaches a predetermined threshold value. The width of the square wave P2 is determined by the time constant by the resistor 504 and capacitor 505. When the pulse width of the square wave P2 increases (like the square wave indicated by a dotted line in FIG. 10B), and the trailing edge shifts behind, the leading edge of the square wave P3 also shifts by the same amount. However, the pulse width of the square wave P3 does not change. Hence, only the phase of the input pulse is modulated and output.

The phase delay amount is given by converting a phase delay which corresponds to the synapse weight for the pulse signal before input to the synapse connection and the pulse signal after the synapse connection. In this embodiment, the larger the synapse weight value becomes, the smaller the phase delay amount becomes.

In place of the phase delay circuit, a time window integration circuit (to be described later) using a predetermined weight function may be used as the synapse connection circuit. In this case, the circuit is designed to multiply the pulse signal by a weight corresponding to the synapse weight.

When a control voltage $E_c$ is changed by a refresh circuit of the reference voltage and the learning circuit 402 which controls the charge storage amount in a capacitor to give a connection weight, the pulse phase (delay amount) can be controlled. To hold the connection weight for a long time, it may be stored by writing it in an analog memory such as a floating gate element (not shown) or a digital memory (e.g., SRAM or MRAM) after the learning operation.

A circuit having circuit elements shown in FIG. 9A is used as an example of the learning circuit 402 in the synapse, which implements simultaneous arrival of pulses or a predetermined phase modulation amount. More specifically, the learning circuit 402 can include a propagation time measuring circuit 510 (the propagation time here indicates the time difference between the pulse output time at the presynapse of a neuron of a certain layer and the arrival time of the pulse at the output destination neuron on the next layer), a time window generation circuit 511, and a pulse shape modulation amount adjusting circuit 512 which adjusts the pulse shape modulation amount in the synapse portion to obtain a predetermined propagation time.

Figure 3B:
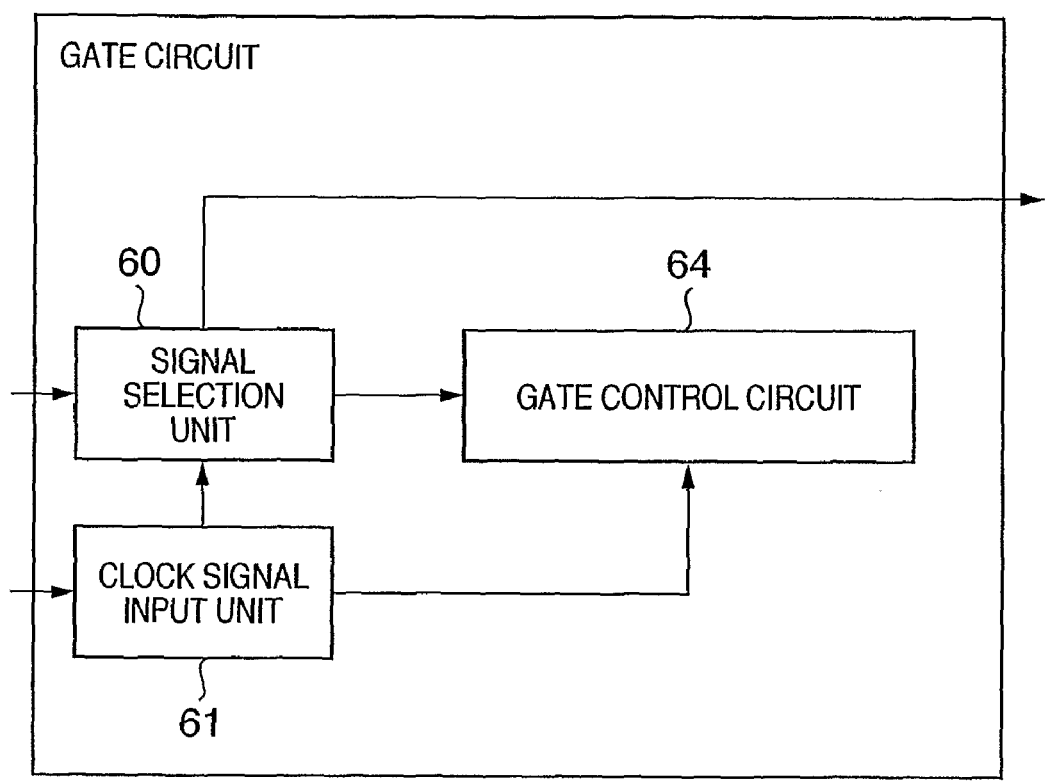
FIG. 3B is a block diagram showing the arrangement of a gate circuit 500.

As the propagation time measuring circuit 510, an arrangement can be used which receives a clock pulse from a timing element that forms a single local receptor field (to be described later) and obtains the propagation time on the basis of the output from the counter circuit of the clock pulse in a predetermined time width (time window: FIG. 3B).

<Processing in Feature Detection Layer (1,0)>

Each neuron of a feature detection layer 10 has a receptor field structure corresponding to $g_m$, and $g_m$ having the same scale index m has a receptor field with the same size. Arithmetically, the corresponding kernel $g_m$ size also has a size corresponding to the scale index. The scales are set in descending order of 30×30, 15×15, 7×7 on an input image. Each neuron outputs a pulse at an output level (the phase is used as the reference: the frequency, amplitude, or pulse width may be used as the reference) as a nonlinear squashing function of a wavelet transform coefficient value obtained by executing product-sum input of the distribution weight function and image data. As a result, Gabor wavelet transform is executed as the output of the entire layer (1,0).

<Processing in Feature Detection Layer (Middle-Order, High-Order Feature Extraction)>

Subsequent feature detection layers ((1,1), (1,2), . . . ) detect middle- to high-order image features at predetermined sampling positions on the input image. Unlike the feature detection layer (1,0), each neuron forms the receptor field structure unique to the feature pattern to be detected by a so-called Hebb learning rule. The size of the local region where feature detection is executed stepwise approaches to the size of the entire recognition target toward the final layer so that the middle- or high-order features are detected geometrically. For example, for detection/recognition of a face, middle-order (or high-order) features are features at the graphic element level such as eyes, nose, and mouth in the face. The feature detection layer neuron can generally (independently of low- and high-order feature extraction) have a mechanism to receive inhibitory (shunting inhibition) connection on the basis of the output from the layer of the preceding layer to stabilize the output.

<Processing in Feature Integration Layer (Image Feature Portion)>

The neuron element of a feature integration layer ((2,0), (2,1), . . . ) As shown in FIG. 2, connection from a feature detection layer (e.g., (1,0)) to a feature integration layer (e.g., (2,0)) is designed such that both the excitatory connection input from the neuron element of the same feature element (type) of the feature detection layer of the preceding stage in the receptor field of the feature integration neuron and the timing element output (PNout1) (to be described later) are received on the excitatory input side shown in FIG. 4. The neuron element of the integration layer is local averaging for each feature category or sub-sampling such as maximum value detection, as described above.

The feature integration layer neuron receives pulses associated with a plurality of features of the same type and integrates and averages them in a local region (receptor field) (or calculates a representative value such as a maximum value in the receptor field), thereby properly detecting even fluctuation or deformation of the position of the feature. For this reason, the receptor field structure of the feature integration layer neuron element can be designed to be uniform (for example, the receptor field is a rectangular region having a predetermined size in which sensitivities or weight coefficients are uniformly distributed) regardless of the feature category.

<Operation Principle of Pattern Detection>

Figure 8A:
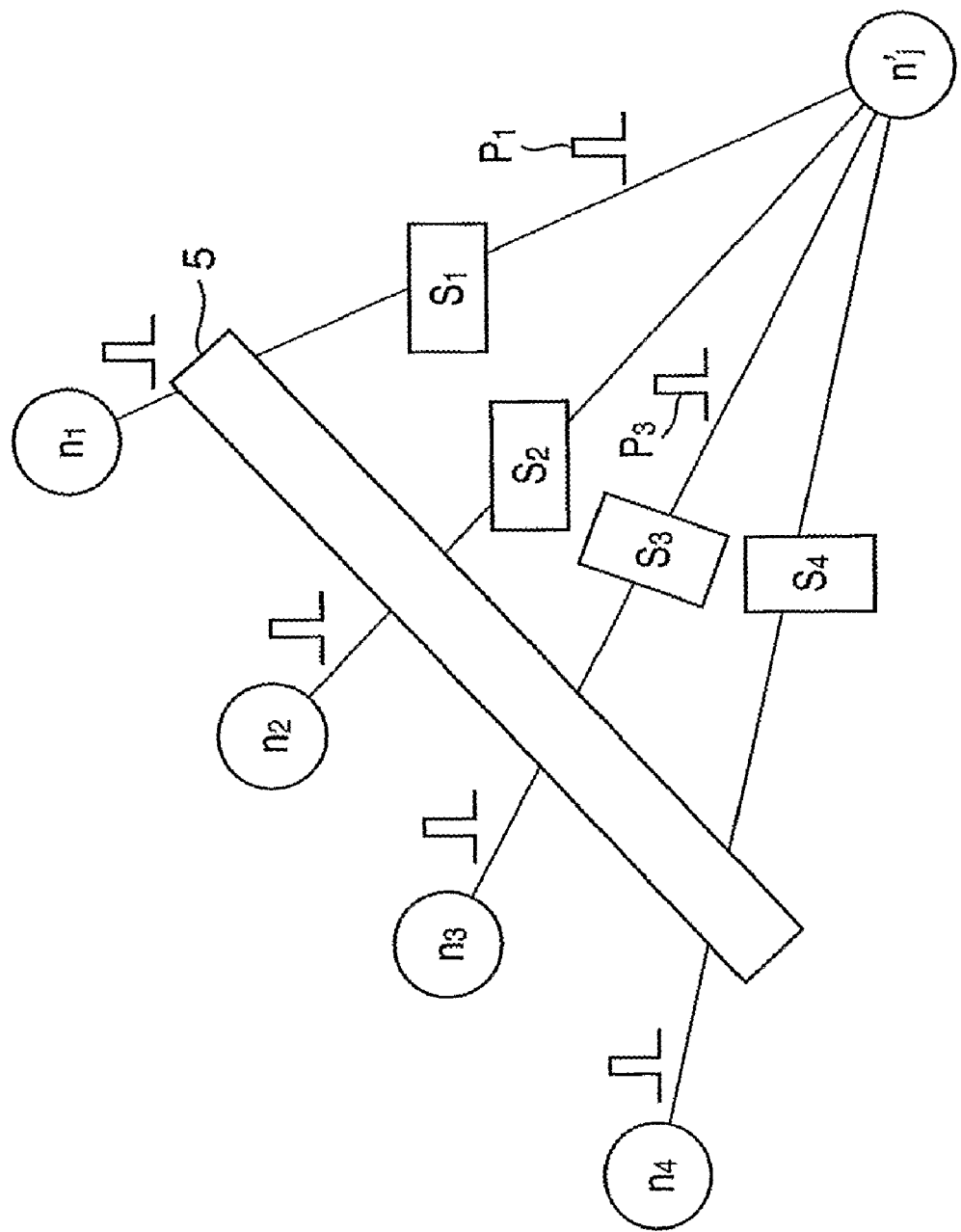
FIG. 8A is a view schematically showing pulse signal propagation from a feature integration layer to a feature detection layer (e.g., from a layer (2,0) to a layer (1,1) in FIG. 2)

Pulse coding and detection method of two-dimensional graphic pattern when the network arrangement shown in FIG. 2 is applied to a pattern recognition apparatus will be described below. FIG. 8A schematically shows pulse signal propagation from a feature integration layer to a feature detection layer (e.g., from the layer (2,0) to the layer (1,1) in FIG. 2). The gate circuit 5 is arranged before synapse connection elements (Sj) to pass only pulse signals (P1 and P3) significant for feature detection. FIG. 8A shows that only pulses modulated by synapse connection elements S1 and S3 propagate. The respective neurons $n_i$ on the feature integration layer side correspond to different feature amounts (or feature elements). The neuron $n'_j$ on the feature detection layer side is involved in detection of a higher-order feature (graphic element) obtained by combining the features in the same receptor field.

On the input side of the synapse connection circuits, the gate circuit 5 is set which opens for only a pulse signal having the maximum value of the upper level to transmit only the upper level of the feature integration layer outputs by connection from the feature integration layer neuron to the feature detection layer neuron. When a timing pulse signal (PN) is input, the output pulse signal from the feature integration layer neuron undergoes modulation processing such as phase modulation by the synapse connection circuit and propagates to the next feature detection layer. In the feature detection layer neuron, time integration of the pulse signal which has passed through the synapse connection for the feature integration layer neuron is executed in the range of the time integration window.

The time window is defined for each feature detection neuron (n'i) commonly to the neurons in the feature integration layer which form the same receptor field for the neuron and gives the time range of the time window integration.

Referring to FIG. 8A, the gate circuit 5 is located before the synapse connections of the feature detection layer neurons. The neurons which input signals to the gate circuit 5 form the receptor field of the feature detection layer neurons. They are all feature integration layer neurons belonging to the same feature class. In this embodiment, the feature detection layer neurons parallelly execute time window integration of the pulse signals which have passed through the gate circuit 5. FIG. 8B schematically shows a state in which the postsynapse signals are parallelly time-window-integrated (a plurality of time window integration operations are executed in almost the same time zone).

The timing element is arranged in the overall control circuit 7 and outputs a timing pulse signal to the feature integration neurons (layer number (2,k−1)) and feature detection neurons (layer number (1,k)), thereby giving a time window generation timing signal when the feature detection neuron temporally adds inputs. The start time of the time window is set as the reference time to measure the arrival time of the pulse output from each feature integration neuron. That is, the timing element gives a reference pulse for the pulse output time from the feature integration neuron and time window integration in the feature detection neuron.

In this embodiment, neurons which correspond to low-order feature elements in the same receptor field on the feature integration layer as the layer of the preceding stage of the feature detection layer and are involved in detecting a predetermined local feature in the input image synchronously fire (output pulses) in predetermined phases. Generally, there is a connection from a neuron of the feature integration layer to a feature detection neuron which detects identical high-order features at different positions (in this case, although the receptor fields are different, connections which form identical high-order features are present). At this time, synchronous firing occurs even between these feature detection neurons.

Each pulse passes through the synapse circuit, is given with a phase delay in a predetermined amount, and arrives at the feature detection neuron through the signal transmission line. The sequence of pulses on the time axis is represented by pulses (P1, P2, and P3) indicated by dotted lines on the time axis of the feature detection neuron.

In the feature detection neuron, when a value larger than the threshold value is obtained by time window integration (normally, time window integration is executed once; charge storage or averaging by a number of times of time window integration may be done) of each of pulses (P1, P2, and P3), pulse output (Pd) is done on the basis of the end time of the time window. The time window in learning shown in FIG. 8A is referred to in executing the learning rule (to be described).

<Feature Detection Layer Processing>

Processing (in learning and recognition) mainly executed in the feature detection layer will be described below. In each feature detection layer, as described above, in a processing channel set for each scale level, pulse signals associated with a plurality of different features from the same receptor field are received, and spatio-temporal weighted summing (load summing) and threshold processing are executed.

In each neuron on the feature detection layer, the spatio-temporal weighted summing (load summing) of the input pulse is executed in only a time window having a predetermined width for a pulse train which has arrived at the neuron. The means for implementing weighted summing in the time window is not limited to the neuron element circuit shown in FIG. 4. The weighted summing may be implemented by any other method.

The time window corresponds to a time zone except the refractory period of the actual neuron to some extent. More specifically, in the refractory period (time range except the time window), no output from the neuron is executed regardless of the input. However, in the time window except that time range, firing corresponding to the input level is done, like the actual neuron.

In this embodiment, the timing pulse signal from the timing element (pulse output at a fixed frequency) in the control circuit is input for all processes in each layer, thereby implementing commonality between the neurons in the above-described time window start period. In the arrangement shown in FIG. 1, when the synapse array circuit block 3 and neuron array circuit block 2 form one layer of the entire hierarchical structure shown in FIG. 2, the timing signal is commonly used in the layer. Even when the synapse array circuit block 3 and neuron array circuit block 2 form a plurality of layers corresponding to part of the entire hierarchical structure shown in FIG. 2, time window synchronization control need not be executed throughout the network (even if it is necessary). The problem of skew of the timing signal is relaxed as a whole.

<Application Example in which Apparatus is Mounted in Image Sensing Apparatus or Robot Visual Head>

When the parallel pulse signal processing apparatus according to this embodiment is mounted, as a pattern recognition (detection) apparatus, in a robot visual head or an image sensing apparatus having an optical-axis direction control mechanism, a specific object in the visual field can be detected at a high speed, and optimum photography (auto-focusing or color correction or exposure of a specific object) control can be executed. The arrangement in this case will be described with reference to FIG. 12.

Figure 12:
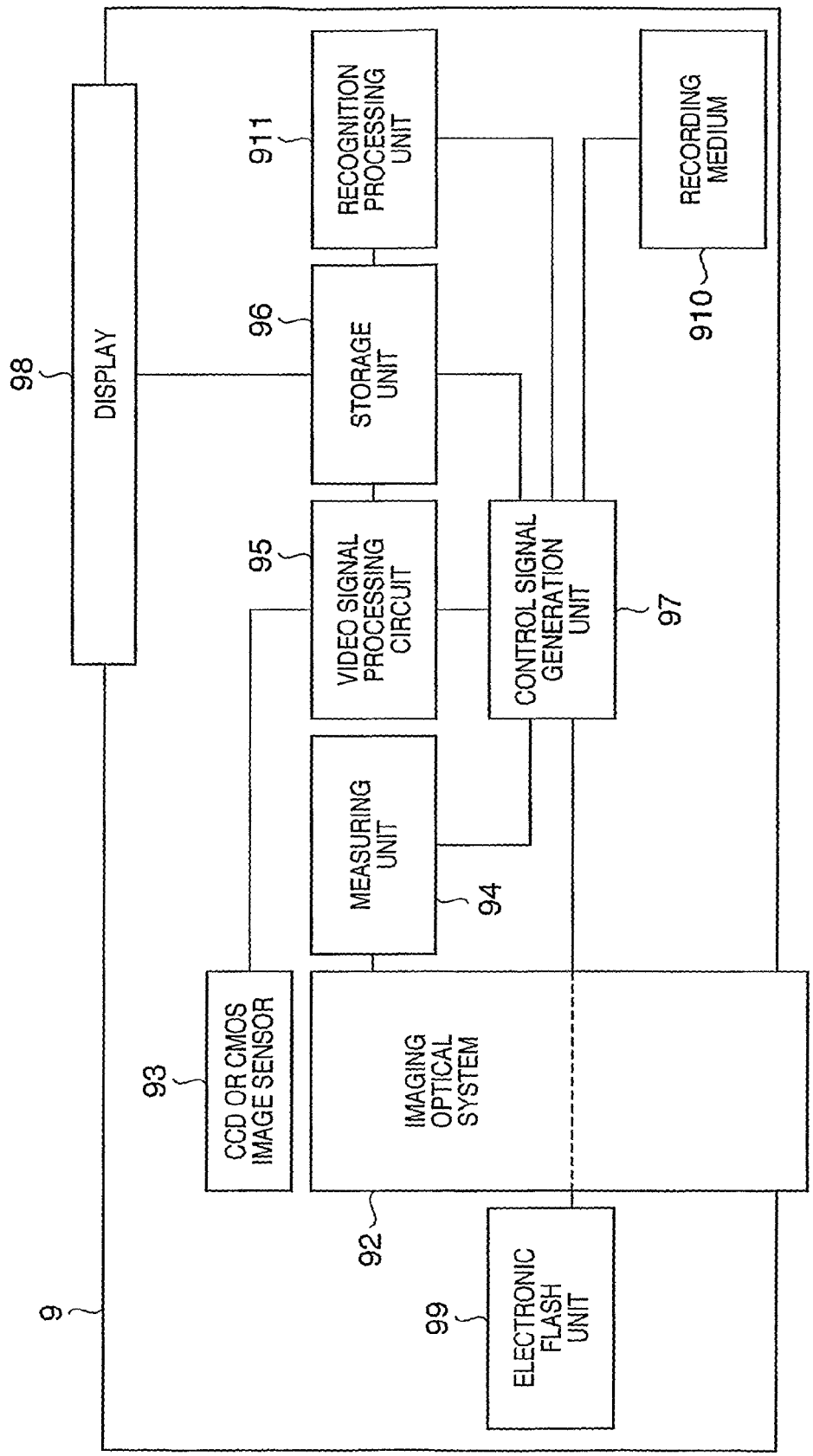
FIG. 12 is a block diagram showing an arrangement example of a photographing apparatus which includes, as a pattern recognition (detection) apparatus, a parallel pulse signal processing means according to the first embodiment of the present invention.

An image sensing apparatus 9 shown in FIG. 12 comprises an imaging optical system 92 which includes a photographing lens and a driving control mechanism for zoom photography and optical-axis direction control, a CCD or CMOS image sensor 93, an image sensing parameter measuring unit 94, a video signal processing circuit 95, a storage unit 96, a control signal generation unit 97 for generating a control signal to control the image sensing operation or image sensing conditions, a display 98 also serving as a viewfinder such as EVF, an electronic flash unit 99, a recording medium 910, and a gaze recognition processing unit 911 (pattern recognition apparatus including the above-described parallel pulse signal processing circuit having the hierarchical structure of this embodiment).

In this image sensing apparatus 9, the direction of presence of a person registered in advance is estimated from an image signal input from the image sensor 93. The optical axis of the imaging optical system 92 is controlled to that direction. The face image (the position of presence and size) is detected by the gaze recognition processing unit 911. The pieces of information of the position (presence direction) and size of the person are input to the control signal generation unit 97. The control signal generation unit 97 generates control signals to optimally control focusing, exposure condition, and white balance for the person on the basis of the output from the image sensing parameter measuring unit 94.

When the parallel pulse signal processing apparatus according to the above-described embodiment is used in the image sensing apparatus which detects (recognizes) a pattern from an image, the object detection (recognition) function can properly be implemented at low power consumption and high speed (real time). Hence, detection of a person or the like and optimum control (AF or AE) of photography based on it can be done.

Second Embodiment

In this embodiment, a pulse signal to a neuron element is input through a common bus line to propagate a bundle of signals after synapse connection. For a feature detection layer neuron, of the outputs from the feature integration layer of the preceding layer, pulses which have undergone phase modulation unique to the feature class are time-serially input. A gate circuit 5 is set after synapse connection circuits on the common bus line where the synapse connections converge.

Figure 6:
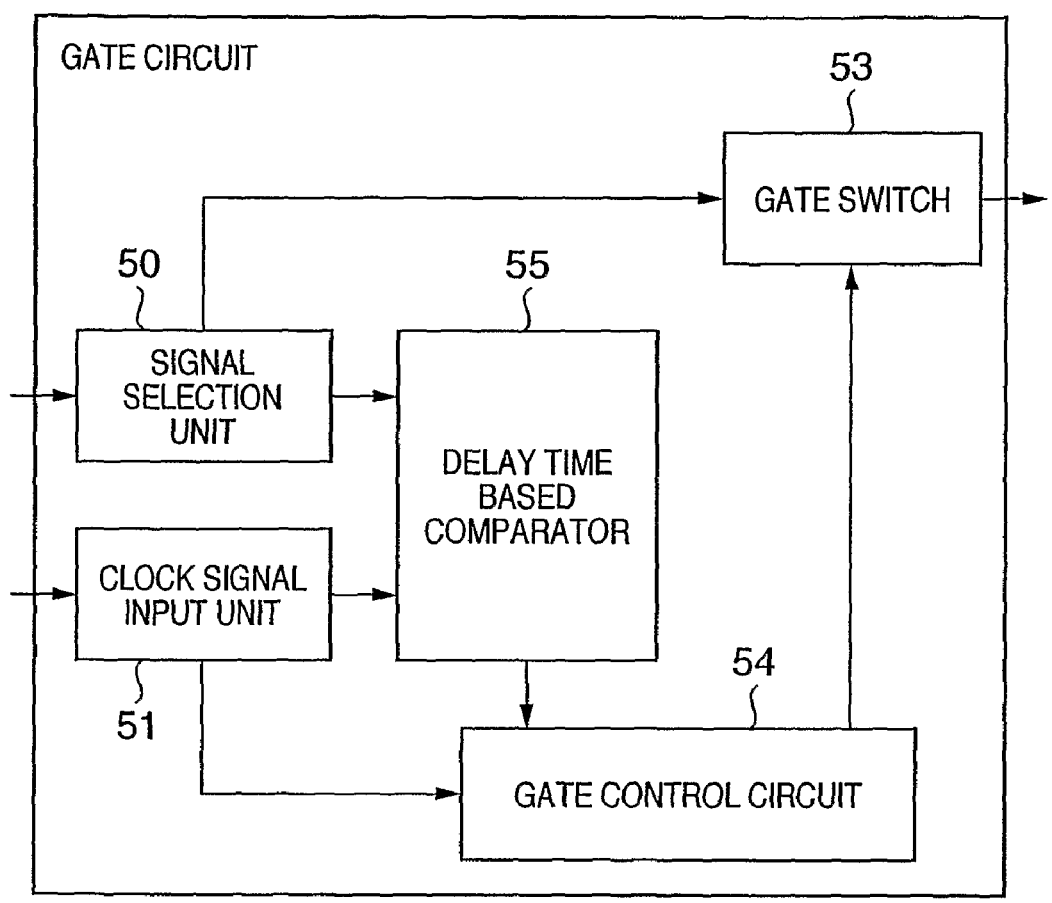
FIG. 6 is a block diagram showing the arrangement of a gate circuit according to the second embodiment of the present invention.

FIG. 6 shows the arrangement of the gate circuit used in this embodiment. The gate circuit 5 includes a signal selection unit 50, clock signal input unit 51, gate switch 53, gate control circuit 54, and delay time based comparator 55. The signal selection unit 50 accesses a processing result holding memory 4 to extract a signal from the receptor field. The signal selection unit 50 has no so-called WTA function.

On the other hand, the comparator 55 is a circuit to select only upper-level signals (or upper-level maximum value signals) on the basis of the delay amount of the pulse arrival time with respect to the reference time given from a timing element. The comparator 55 can be regarded as a WTA circuit in the time-axis domain. The functions of the remaining constituent elements are the same as those in the arrangement shown in FIG. 3A described in the first embodiment.

Figure 8C:
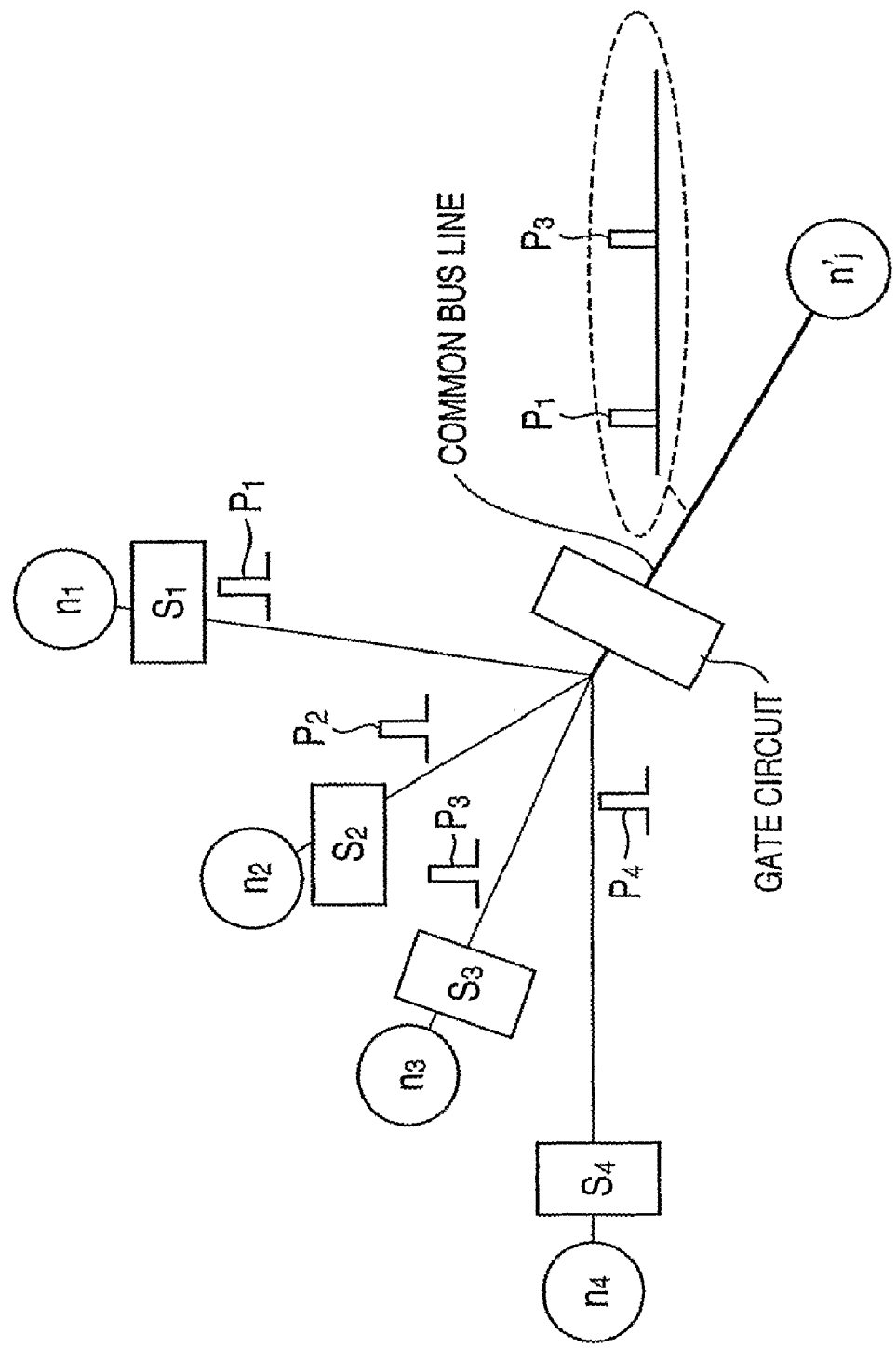
FIG. 8C is a view showing inter-neuron connection according to the second embodiment.

Referring to FIG. 8C, in each inter-neuron connection, a unique delay (unique to the feature) is generated due to the pulse propagation time and the time delay in the synapse connection ($S_{j,i}$) from a neuron $n_i$ to a neuron $n'_j$. As a result, a pulse train $P_i$ arriving at the neuron $n'_j$ has a predetermined order (and interval) on the basis of the delay amount in the synapse connection determined by learning as long as a pulse is output from each neuron of the feature integration layer (FIG. 8C shows that pulses arrive in the order of P4, P3, P2, and P1). As described above, the gate circuit 5 selectively passes the pulse signals of the pulse train which are modulated by the synapse connections and propagate on the common bus.

FIG. 8D shows the timing of pulse propagation from feature integration neurons $n_1$, $n_2$, and $n_3$ (the neurons express features of different kinds) on a layer (2,k) to a feature detection neuron ($n'_j$) (the neuron executes upper feature detection) on a layer (1,k+1) after a timing signal is input to a feature integration layer neuron.

Calculation processing of the internal state of the feature detection layer neuron is executed by predetermined weighed time window integration. Referring to FIG. 8C, in the feature detection layer neuron, time window integration to be described later is not executed before input from the timing element. The integration is triggered by pulse input from the timing element.

The refractory period shown in FIG. 8D is the time zone immediately after firing of the feature detection neuron until the next time window start time. The length of the refractory period and the width of the time window can arbitrarily be set. The refractory period need not always be shorter than the time window as shown in FIG. 8D.

Pulses corresponding to feature amounts arrive at a predetermined time interval due to a delay amount (phase) defined in advance by learning. Learning control of the pulse arrival time pattern is not the gist of this embodiment, and a detailed description thereof will be omitted. For example, competitive learning is introduced so that a pulse for a feature element of a graphic pattern, which most contributes to detection of the graphic, arrives early. For feature elements whose pulse arrival times can almost the same, the pulses arrive at a predetermined interval. Alternatively, the pulses may arrive at different time intervals for predetermined feature elements (feature elements which form the recognition target and can be regarded as especially important: e.g., features having a large mean curvature or high linearity).

<Spatio-Temporal Integration of Pulse Outputs and Network Characteristic>

The arithmetic processing of spatio-temporal weighted summing (load summing) of input pulses will be described next. As shown in FIG. 11B, in each neuron, the weight sum of input pulses is calculated for each sub-time window (for each time slot) by using a predetermined weight function. The sum of the weight sums is compared with the threshold value. In this case, $\tau_1$ represents the central position of the weight function in a sub-time window j. It is represented on the basis of the time window start time (elapse time from the start time). The weight function is generally a function of the distance (shift on the time axis) from a predetermined central position (representing the pulse arrival time when a feature to be detected is detected).

In the synapse, phase modulation corresponding to the type of feature is executed. If multiplication of the synapse weight value and the signal is not executed, in time window integration, multiplication corresponding to the synapse weight is executed for the neuron output level in the layer of the preceding stage by referring to the weight function.

Assume that the weight function in each sub-time window has a symmetrical shape, or the weight function is a function of the distance on the time axis. When the central position τ of the weight function in each sub-time window (time slot) of the neuron indicates the time delay after learning between neurons, the neural network which executes the spatio-temporal weighted summing (load summing) of input pulses can be regarded as a kind of radial basis function network (to be abbreviated as RBF hereinafter) of the time axis domain.

The weight function may have an asymmetrical shape (as shown in FIG. 11B) or take a negative value. For example, assume that the neuron of a feature detection layer is expected to finally detect a triangle, and a feature ($F_{false}$) which is apparently not the constituent element of the graphic pattern is detected. In this case, to prevent triangle detection output from finally being done even when the contribution from the remaining feature elements is large, connection from a weight function and feature detection (integration) neuron, which gives negative contribution, can be given in advance from a pulse corresponding to the feature ($F_{false}$) in the input sum calculation processing.

A spatio-temporal sum $X_i(t)$ to the neuron $n_i$ of the feature detection layer is given by $$x_i(t) = \sum_j S_{ij} F_{Ti}(t) Y_j(t - \tau_{ij} - \varepsilon_j)$$

where $\varepsilon_j$ is the initial phase of the output pulse from the neuron $n_j$, $F_{Ti}$ is the time window weight function. When convergence to 0 occurs by synchronous firing with the neuron $n_i$ or the phase of the time window is forcibly synchronized with 0 by timing pulse input, $\varepsilon_j$ can always be 0.

Figure 11C:
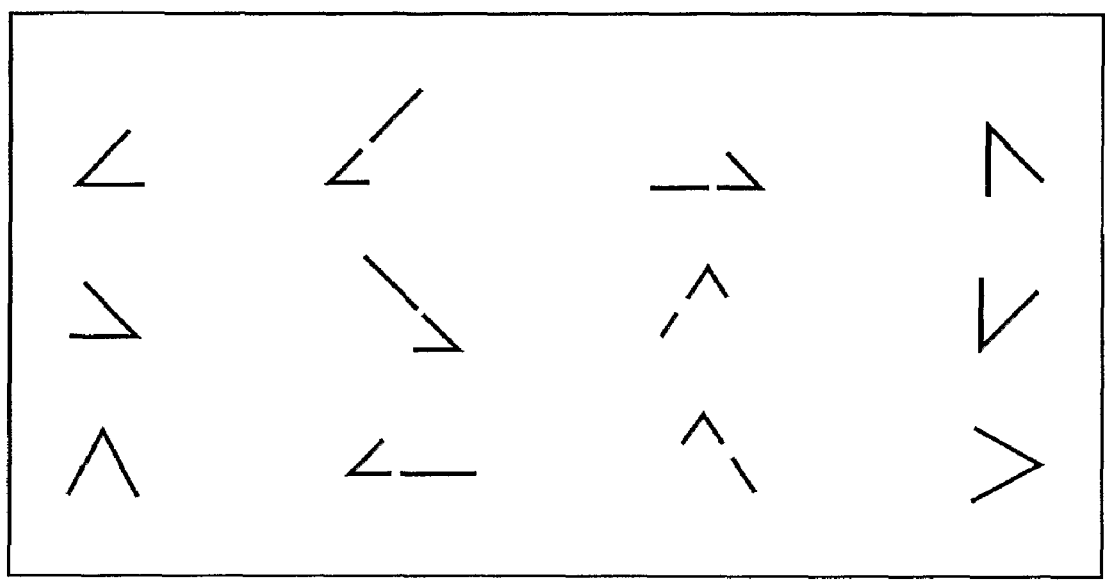
FIG. 11C is a view showing graphic features (feature elements) to which the feature detection neuron to detect a triangle as a feature reacts, including L-shaped patterns ($f_{11}$, $f_{12}$, ...) having various directions, combination patterns ($f_{21}$, $f_{22}$, ...) of line segments having continuity (connectivity) to the L-shaped patterns, and combinations ($f_{31}$, ...) of parts of two sides included in triangles.
Figure 11D:
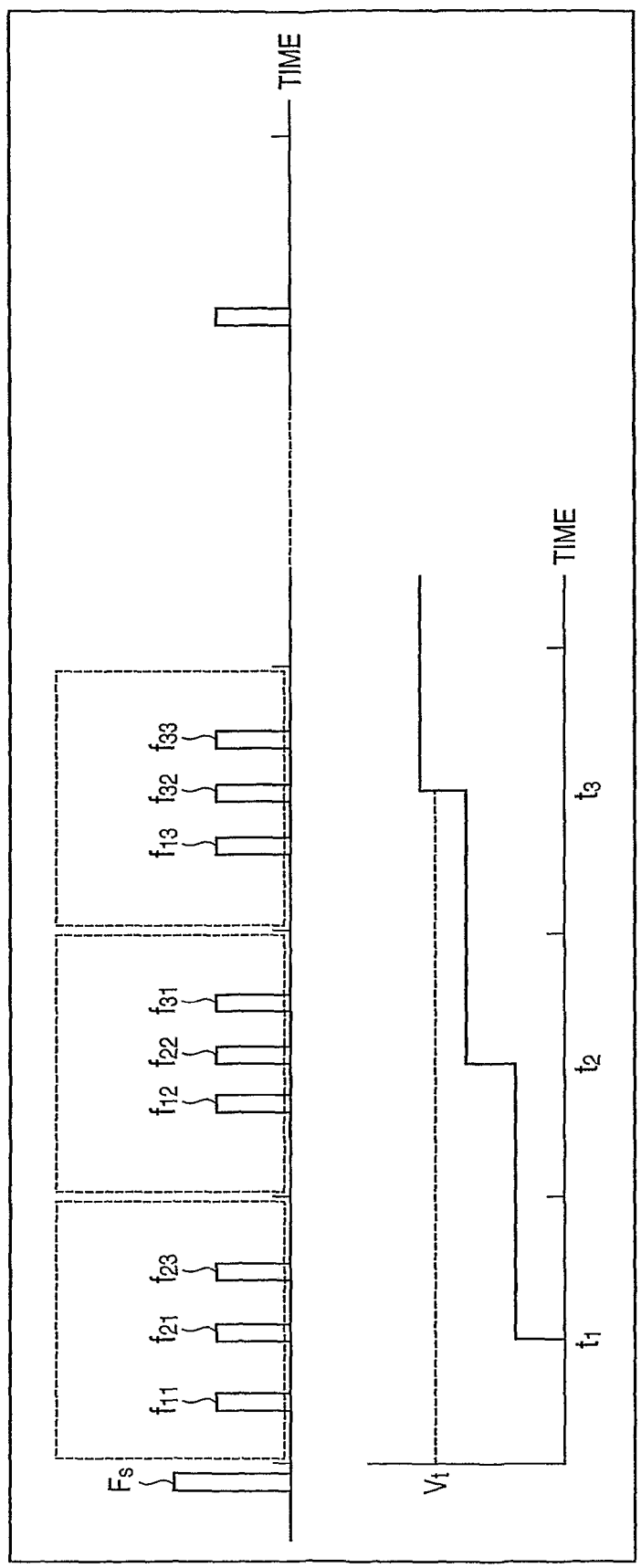
FIG. 11D is a timing chart showing the time transition of a weight sum value which is obtained by executing weighted summing by pulse input shown in FIG. 11A and the weight function shown in FIG. 11B.

When weighted summing by the pulse input shown in FIG. 11A and the weight function shown in FIG. 11B is executed, the time transition of the weight sum value as shown in FIG. 11D is obtained. When the weight sum value reaches a threshold value ($V_t$), the feature detection neuron outputs a pulse. The output pulse signal from the neuron $n_i$ is output to the neuron of the upper layer with an output level as the squashing nonlinear function of the spatio-temporal sum (so-called total input sum) of the input signals and a time delay (phase) given by the learning, as described above (the pulse output has a fixed frequency (binary) and is output by adding a phase modulation amount as the squashing nonlinear function for the spatio-temporal sum of the input signals to the phase corresponding to the fixed delay amount determined by learning).

A feature detection neuron which detects a triangle as a feature will be described below for the sake of simplicity. The feature integration layer of the preceding layer reacts to graphical features (feature elements) as shown in FIG. 11C such as L-shaped patterns ($f_{11}$, $f_{12}$, . . . ) having various directions, combination patterns ($f_{21}$, $f_{22}$, . . . ) of line segments having continuity (connectivity) to the L-shaped patterns, and combinations ($f_{31}$, . . . ) of parts of two sides which form a triangle.

Referring to FIG. 11C, $f_{41}$, $f_{42}$, and $f_{43}$ indicate features which form triangles with different directions, i.e., features corresponding to $f_{11}$, $f_{12}$, and $f_{13}$. When a unique delay amount is set by learning between neurons which form interlayer connection, in the feature detection neuron for the triangle, in each sub-time window (time slot) (w1, w2, . . . ) obtained by dividing the time window, setting is done in advance such that pulses corresponding major and different features of the triangle should arrive.

For example, pulses corresponding to the combination of feature sets which form a triangle as a whole arrive first at w1, w2, . . . , wn after the time window is divided by n, as shown in FIG. 11A. The delay amount is set by learning such that the L-shaped patterns ($f_{11}$, $f_{12}$, and $f_{13}$) arrive in w1, w2, and w3, and the pulses corresponding to the feature elements ($f_{21}$, $f_{22}$, and $f_{23}$) arrive in w1, w2, and w3.

Pulses corresponding to the feature elements ($f_{31}$, $f_{32}$, and $f_{33}$) also arrive in the same order as described above. In the example shown in FIG. 11A, a pulse corresponding to one feature element arrives in one sub-time window (time slot).

Assume that the setting is done in advance such that a pulse corresponding to an important feature arrives in an early sub-time window. When the weight function value in the sub-time window is larger than the value in another sub-time window, the significant feature can more easily be detected. The significance (detection priority of features) can be acquired by learning or defined in advance.

The number of divided sub-time windows (time slots), the width of each sub-time window (time slot), the feature class, and the time interval allocation of a pulse corresponding to a feature are not limited to the above description and can be changed.

Third Embodiment

In this embodiment, on the basis of the distribution of synapse connections which form the receptor field of a feature detection layer neuron, a gate circuit selects a synapse connection whose intensity is maximum and whose absolute value falls within the range of top k (k is a natural number), and passes only a pulse signal from the synapse connection.

Figure 5:
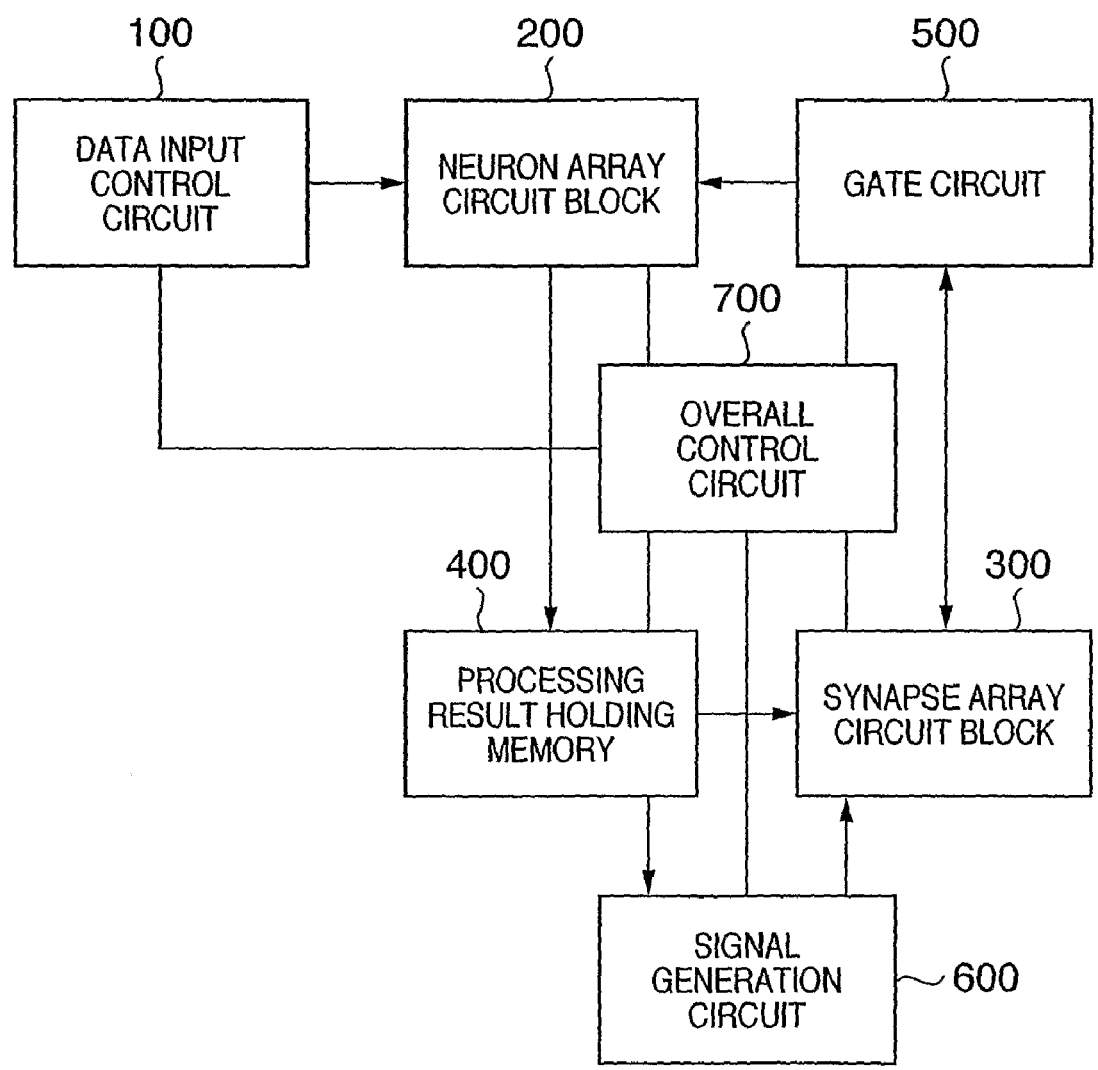
FIG. 5 is a block diagram showing the arrangement of the main part of a parallel pulse signal processing apparatus according to the third embodiment of the present invention.

FIG. 5 shows the main part of a parallel pulse signal processing apparatus according to this embodiment. The parallel pulse signal processing apparatus includes, as main constituent elements, a data input control circuit 100, neuron array circuit block 200, synapse array circuit block 300, processing result holding memory 400, gate circuit 500, signal generation circuit 600, and overall control circuit 700. The function of each constituent element is the same as in the first embodiment except the gate circuit 500.

Unlike the arrangement of the first embodiment, the gate circuit 500 accesses the synapse array circuit block 300 and selects a significant synapse connection. A significant synapse connection indicates a synapse connection whose intensity is maximum and whose absolute value falls within the range of top k (k is a natural number), as described above.

FIG. 3B shows the arrangement of the gate circuit 500 which includes, as main constituent elements, a signal selection unit 60, clock signal input unit 61, and gate control circuit 64. The signal selection unit 60 has a function of a WTA circuit (see reference 3 in the first embodiment) to temporarily read out all synapse connection data from the internal memory of the synapse connection circuit array 300 shown in FIG. 5 and extract the weight values of synapse connections corresponding to the maximum values of top k from the memory addresses, and selects the address of a significant synapse connection. The gate control circuit 64 selectively passes a pulse signal modulated by the synapse connection extracted by the signal selection unit in synchronism with a timing signal from the clock signal input unit 61.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-077041 filed on Mar. 17, 2004, the entire contents of which are hereby incorporated by reference herein.

The invention claimed is:

1. A parallel pulse signal processing apparatus, comprising:
   a plurality of pulse output arithmetic elements;
   a plurality of connection elements which connect predetermined elements of the arithmetic elements in parallel; and
   a gate circuit which selectively passes pulse signals received from the plurality of connection elements,
   wherein the pulse output arithmetic elements comprise:
   input means for inputting a plurality of time series pulse signals;
   modulation processing means for executing predetermined modulation processing on a basis of the input plurality of time series pulse signals; and
   pulse output means for outputting a pulse signal on a basis of a result of the modulation processing, and
   wherein said gate circuit counts, of the pulse signals output from the plurality of pulse output arithmetic elements and received from said plurality of connection elements, pulse signals corresponding to predetermined upper output levels, and passes the pulse signals corresponding to the predetermined upper output levels until a number of the counted pulse signals reaches a predetermined number.

2. The apparatus according to claim 1, further comprising a timing signal generation circuit to generate a predetermined timing signal,
   wherein after the predetermined timing signal from said timing signal generation circuit is input to said gate circuit, said gate circuit counts, of the pulse signals output from the plurality of pulse output arithmetic elements and received from said plurality of connection elements, the pulse signals corresponding to predetermined upper output levels, and passes the pulse signals corresponding to the predetermined upper output levels until the number of the counted pulse signals reaches the predetermined number.

3. The apparatus according to claim 2, wherein said gate circuit counts, of the pulse signals output from the plurality of pulse output arithmetic elements and received from said plurality of connection elements, the pulse signals in ascending order of delays with respect to the timing signal from said timing signal generation circuit, and passes the pulse signals corresponding to the predetermined upper output levels until the number of the counted pulse signals reaches the predetermined number.

4. The apparatus according to claim 1, wherein said gate circuit is arranged on a predetermined bus connected to said plurality of connection elements and passes the predetermined number of pulse signals corresponding to the predetermined upper output levels from among the pulse signals propagating on the bus.

5. The apparatus according to claim 1, wherein said arithmetic element integrates an input pulse signal train in a predetermined time window and outputs the pulse signal at one of a phase and a frequency corresponding to an integration value.

6. The apparatus according to claim 1, wherein said gate circuit includes a switching circuit selectively connected to, of said plurality of connection elements, a connection element whose connection strength takes a maximum value and not less than a predetermined level.

7. The apparatus according to claim 1, wherein said gate circuit includes a switching circuit selectively connected to, of said plurality of connection elements, a connection element whose connection strength is not less than a predetermined level.

8. The apparatus according to claim 1, wherein said gate circuit counts, of the pulse signals output from the plurality of pulse output arithmetic elements and received from said plurality of connection elements, the pulse signals in ascending order of delays with respect to a predetermined reference time, and passes the pulse signals corresponding to the predetermined upper output levels until the number of the counted pulse signals reaches the predetermined number.

9. The apparatus according to claim 1, wherein said gate circuit counts, of the pulse signals output from the plurality of pulse output arithmetic elements and received from said plurality of connection elements, pulse signals having a local maximum value from an uppermost level, and passes the signals having the local maximum value until a number of the counted pulse signals reaches a predetermined number.

10. A pattern recognition apparatus comprising a parallel pulse signal processing apparatus of claim 1.

11. An image input apparatus, wherein pattern recognition is executed by using a parallel pulse signal processing apparatus of claim 1, and input control of a predetermined image signal is executed on a basis of a pattern recognition result.

12. A control method of an image input apparatus comprising executing pattern recognition by using a parallel pulse signal processing apparatus of claim 1, and executing input control of a predetermined image signal on a basis of a pattern recognition result.

13. A parallel pulse signal processing apparatus which hierarchically executes a plurality of arithmetic processing operations, comprising:
- a plurality of arithmetic elements which receives signals from different layer levels and outputs predetermined pulse signals by a predetermined local receptor field structure; and
- a gate circuit element which counts, of the pulse signals output from said plurality of arithmetic elements belonging to a predetermined receptor field, pulse signals corresponding to predetermined upper output levels, and passes the pulse signals corresponding to the predetermined upper output levels until a number of the counted pulse signals reaches a predetermined number.

14. The apparatus according to claim 13, wherein said gate circuit counts pulse signals corresponding to upper output levels, and passes the pulse signals corresponding to the upper output levels until a number of the counted pulse signals reaches a predetermined number, for each feature.

15. A parallel pulse signal processing apparatus comprising:
- input means for inputting data in a predetermined dimension;
- a plurality of data processing means;
- a gate circuit which selectively passes pulse signals from said data processing means; and
- output means for outputting a result of pattern detection,
- wherein said data processing means includes a plurality of arithmetic elements connected by predetermined connection means in parallel,
- wherein said arithmetic elements included in said data processing means output a pulse shaped signal train representing a detection result of a pattern of a predetermined category on a basis of an arrival time pattern of a plurality of pulses from predetermined arithmetic elements input in a predetermined time window,
- wherein said gate circuit counts, of pulse signals included in the pulse shaped signal train output from the plurality of arithmetic elements and received from said plurality of connection elements, pulse signals corresponding to predetermined upper output levels, and passes the pulse signals corresponding to the predetermined upper output levels until a number of the counted pulse signals reaches a predetermined number, and
- wherein said output means outputs the detection result of the predetermined pattern in the data on a basis of the outputs from said arithmetic elements.

16. A parallel pulse signal processing apparatus comprising:
- input means for inputting data in a predetermined dimension;
- a plurality of data processing means for outputting pulse signals;
- a gate circuit which selectively passes pulse signals output and received from said data processing means; and
- output means for outputting a result of pattern detection,
- wherein said data processing means includes a plurality of arithmetic elements connected by predetermined connection means in parallel,
- wherein said gate circuit counts, of the pulse signals output and received from said plurality of data processing means, pulse signals corresponding to predetermined upper output levels, and passes the pulse signals corresponding to the predetermined upper output levels until a number of the counted pulse signals reaches a predetermined number,
- wherein said arithmetic elements receive a time series pulse signal, identify time series pulse signal patterns of a plurality of classes, and output a pulse shaped signal train unique to an arrival time pattern of a plurality of predetermined pulse signals input in a predetermined time window, and
- wherein said output means outputs the detection result of a predetermined pattern in the data on the basis of the outputs from said arithmetic elements.

17. A parallel pulse signal processing apparatus which hierarchically executes a plurality of arithmetic processing operations, comprising:
- input means for inputting one of an intermediate result of different layer levels and data from a predetermined memory;
- a plurality of data processing means, having a feature detection layer which detects a plurality of features from the data input by said input means, for outputting pulse signals; and
- a timing signal generation circuit,
- wherein said plurality of data processing means further comprises:
- a plurality of arithmetic elements which receives detection signals of the features of different types from a layer level of a preceding stage and outputs predetermined pulse signals; and
- a gate circuit which counts, of the pulse signals output from said arithmetic elements involved in the plurality of predetermined features, pulse signals corresponding to predetermined upper output levels, and passes the pulse signals corresponding to the predetermined upper output levels until a number of the counted pulse signals reaches a predetermined number, and
- wherein said arithmetic elements output the pulse signals at one of a frequency and a timing based on a plurality of input signals from said timing signal generation circuit and an arrival time pattern of a plurality of pulses in a predetermined time window.

18. A control method of a parallel pulse signal processing apparatus, said apparatus including a plurality of pulse output arithmetic elements, a plurality of connection elements which connect predetermined arithmetic elements in parallel, and a gate circuit which selectively passes pulse signals received from the plurality of connection elements, wherein said control method comprises:
- using the arithmetic elements to perform;
- inputting a plurality of time series pulse signals;
- executing predetermined modulation processing on the basis of the input plurality of time series pulse signals; and
- outputting a pulse signal on a basis of a result of the modulation processing, and
- wherein the gate circuit counts, of the pulse signals output from the plurality of pulse output arithmetic elements and received from said plurality of connection elements, pulse signals corresponding to predetermined upper output levels, and passes the pulse signals corresponding to the predetermined upper output levels until a number of the counted pulse signals reaches a predetermined number.

19. A control method of a parallel pulse signal processing apparatus which hierarchically executes a plurality of arithmetic processing operations, comprising:
- receiving by a plurality of arithmetic elements signals from different layer levels and outputting by the plurality of arithmetic elements predetermined pulse signals by a predetermined local receptor field structure; and counting by a gate circuit element, of the pulse signals output from the plurality of arithmetic elements belonging to a predetermined receptor field, pulse signals corresponding to predetermined upper output levels and passing by the gate circuit element the pulse signals corresponding to the predetermined upper output levels until a number of the counted pulse signals reaches a predetermined number.

20. A control method of a parallel pulse signal processing apparatus, said apparatus including input means for inputting data in a predetermined dimension, a plurality of data processing means, a gate circuit which selectively passes signals from the data processing means, and output means for outputting a result of pattern detection, wherein said control method comprises:

outputting by each of a plurality of arithmetic elements, which are included in the data processing means and are connected by predetermined connection means in parallel, a pulse shaped signal train representing a detection result of a pattern of a predetermined category on a basis of an arrival time pattern of a plurality of pulses from predetermined arithmetic elements input in a predetermined time window;

counting by the gate circuit, of pulse signals included in the pulse shaped signal train output from the plurality of arithmetic elements and received from said plurality of connection elements, pulse signals corresponding to predetermined upper output levels, and passing by the pulse signals corresponding to the predetermined upper output levels until a number of the counted pulse signals reaches a predetermined number; and outputting by the output means the detection result of the predetermined pattern in the data on a basis of the outputs from the arithmetic elements.

21. A control method of a parallel pulse signal processing apparatus, said apparatus including input means for inputting data in a predetermined dimension, a plurality of data processing means for outputting pulse signals, a gate circuit which selectively passes pulse signals output and received from the data processing means, and output means for outputting a result of pattern detection, wherein said control method comprises:

counting by the gate circuit, of the pulse signals output and received from said plurality of data processing means, pulse signals corresponding to predetermined upper output levels, and passing by the gate circuit the pulse signals corresponding to the predetermined upper output levels until a number of the counted pulse signals reaches a predetermined number;

receiving by a plurality of arithmetic elements, which are included in the data processing means and are connected by predetermined connection means in parallel, a time series pulse signal, identifying time series pulse signal patterns of a plurality of classes, and outputting a pulse shaped signal train unique to an arrival time pattern of a plurality of predetermined pulse signals input in a predetermined time window; and outputting by the output means the detection result of a predetermined pattern in the data on a basis of the outputs from the arithmetic elements.

22. A control method of a parallel pulse signal processing apparatus which hierarchically executes a plurality of arithmetic processing operations, the parallel pulse signal processing apparatus including input means for inputting one of an intermediate result of different layer levels and data from a predetermined memory, a plurality of data processing means, having a feature detection layer which detects a plurality of features from the data input by the input means, for outputting pulse signals, and a timing signal generation circuit, wherein said control method comprises:

under the control of the data processing means, receiving by a plurality of arithmetic elements detection signals of the features of different types from a layer level of a preceding stage and output predetermined pulse signals;

counting by a gate circuit element, of the pulse signals output from the arithmetic elements involved in the plurality of predetermined features, pulse signals corresponding to predetermined upper output levels, and passing by the gate circuit element the pulse signals corresponding to the predetermined upper output levels until a number of the counted pulse signals reaches a predetermined number; and outputting by the arithmetic elements pulse shaped signals at one of a frequency and a timing based on a plurality of input signals from the timing signal generation circuit and an arrival time pattern of a plurality of pulses in a predetermined time window.

* * * * *